(12) United States Patent
Dotson

(10) Patent No.: US 8,089,753 B2
(45) Date of Patent: Jan. 3, 2012

(54) COMPUTER CARRYING, COOLING AND SUPPORT DEVICE

(76) Inventor: Leslie Chan Dotson, New Rochelle, NY (US)

( * ) Notice: Subject to any disclaimer, the term of this patent is extended or adjusted under 35 U.S.C. 154(b) by 0 days.

(21) Appl. No.: 12/658,547

(22) Filed: Feb. 9, 2010

(65) Prior Publication Data

US 2010/0270188 A1    Oct. 28, 2010

Related U.S. Application Data

(60) Provisional application No. 61/150,877, filed on Feb. 9, 2009.

(30) Foreign Application Priority Data

Sep. 14, 2009   (CN) .................. 2009 2 0216617 U

(51) Int. Cl.
    *H05K 7/20* (2006.01)
(52) U.S. Cl. .............. 361/679.48; 361/679.47; 361/695; 165/80.3; 165/122; 454/184
(58) Field of Classification Search .......... None
    See application file for complete search history.

(56) References Cited

U.S. PATENT DOCUMENTS

| | | | |
|---|---|---|---|
| 5,992,155 A | 11/1999 | Kobayashi et al. | |
| 7,038,909 B1 | 5/2006 | Chen | |
| 7,106,585 B2 | 9/2006 | Lin | |
| 7,366,925 B2 | 4/2008 | Keely et al. | |
| 7,573,710 B2 * | 8/2009 | Morino et al. | 361/679.55 |
| 7,630,195 B2 * | 12/2009 | Lin | 361/679.26 |
| 7,800,903 B2 * | 9/2010 | Wang | 361/695 |
| 7,830,661 B2 * | 11/2010 | Sween et al. | 361/695 |
| 7,857,276 B2 * | 12/2010 | Chen | 248/346.01 |
| 7,881,053 B1 * | 2/2011 | Huang | 361/679.48 |
| 7,885,068 B2 * | 2/2011 | Seo et al. | 361/695 |
| 2003/0217940 A1 | 11/2003 | Russell et al. | |
| 2004/0134813 A1 | 7/2004 | Domotor | |
| 2008/0007910 A1 * | 1/2008 | Lin | 361/687 |
| 2008/0283349 A1 | 11/2008 | Taieb | |
| 2009/0002932 A1 * | 1/2009 | Lord et al. | 361/683 |
| 2009/0078707 A1 | 3/2009 | Chen | |
| 2009/0133316 A1 | 5/2009 | Richter | |
| 2010/0214737 A1 * | 8/2010 | Huang | 361/679.48 |

* cited by examiner

*Primary Examiner* — Boris Chervinsky
(74) *Attorney, Agent, or Firm* — The Law Offices of Holly Ying Li

(57) ABSTRACT

A combined carrying, cooling and support device for a portable electronic unit is provided, the device including: a flexible cushioned cooler having a base portion, an angled side portion disposed at an acute angle relative to the base portion, and an integrated cooling fan; an attachment mechanism disposed about the periphery of the flexible cushioned cooler; and an upper cover removably attachable to the flexible cushioned cooler by the attachment mechanism, wherein the flexible cushioned cooler is configured to form an elongated cooling air channel between its base portion, its at least one angled side portion, and a bottom surface of the portable electronic unit.

21 Claims, 17 Drawing Sheets

COMPUTER CARRYING, COOLING AND SUPPORT DEVICE

CROSS-REFERENCE TO RELATED APPLICATIONS

This application claims domestic priority under 35 U.S.C. §119 to U.S. Provisional Patent Application No. 61/150,877, filed on Feb. 9, 2009, and entitled "FAN-COOLED COMPUTER CASE (CHILL CASE)", the disclosure of which is incorporated by reference herein in its entirety. In addition, this application claims foreign priority under 35 U.S.C. §119 to Chinese Patent Application No. 2009/20216617.1, filed on Sep. 14, 2009, in the State Intellectual Property Office of the Peoples Republic of China (SIPO), the disclosure of which is incorporated by reference herein in its entirety.

BACKGROUND OF THE INVENTION

The present disclosure generally relates to totes for portable computers. More particularly, the present disclosure relates to a combined computer carrying, cooling and support device.

Portable computers, such as laptops, notebooks and tablets, are often used between homes and offices, as well as during travel or leisure. Users typically transport the portable computer in a cushioned tote, carrying case, padded computer bag, backpack, travel suitcase, shoulder sling bag or the like to protect each computer from loss or damage. Portable computers are generally valued by their users in terms of hardware, software, and particularly data.

Once a portable computer is removed from its tote, a user typically operates the computer by placing it upon their lap, thighs and/or knees for ease of reach and adequate viewing. Such computers may also be placed upon various make-shift stands, or upon furniture such as tables, desks, chairs, sofas and beds. Portable computers produce heat, and typically dissipate heat from their lower surfaces. Heat may be transferred by conduction, convection, and/or radiation. Thus, excess heat is typically directed towards users' laps, legs or knees, often causing discomfort.

During normal use, the temperature from the bottom surface of a portable computer is generally tolerable; but it may become uncomfortable in full mode applications or when cooling airflow is restricted. In addition, if a portable computer is used on a very soft or overly compliant external surface for too long, such as on a pillow, bed sheet, quilt or rug, the heat build-up and consequent rise in temperature may damage the external materials and/or the computer itself. The hard disk drive of a computer may be particularly susceptible to permanent damage from overheating. Thus, using portable computers for long periods of time with obstructed ventilation of their built-in cooling fans may lead to a large amount of heat and consequent damage, depending upon the heat transfer characteristics and airflow capabilities of the surfaces upon which they are operated.

To address some of these issues, separate cooling devices have been offered for portable computers. Such devices have been equipped with fans, cooling surfaces or cooling chemical agents to dissipate heat from the portable computers without overheating the user. Such devices are typically large in size to provide an adequate cooling surface, and made of hard materials such as ABS plastic or metal to dissipate heat efficiently. Therefore, such cooling devices may be difficult to carry in a typical tote. In addition, since these devices are typically made of hard materials, and may be transported within a tote adjacent to a portable computer, such computer coolers may cause physical damage to the adjacent surfaces of the portable computers, particularly if the totes are mishandled or impacted by external forces.

Users may select totes from among carrying cases, computer cases, backpacks, travel suitcases or shoulder sling bags of a desired type to carry their portable computers when they are at an office, home, leisure or traveling. They may choose one of the above-mentioned totes to carry their portable computer, remove the computer from the tote, place the computer on their lap, and then install one of the separate cooling devices. Unfortunately, since the cooling devices are typically bulky and often considered too large or heavy for the limited capacity of a given tote, the coolers may not be considered convenient for carrying in such totes. Thus, users often leave them behind.

When external portable computer cooling devices are not available, users may try to find other alternatives (e.g. pillows, newspapers, quilts, bed sheets, etc.) to keep the heat away from their laps. Unfortunately, these alternatives can lead to higher temperatures at the bottom of the computer because they often restrict the proper flow of cooling air across the bottom surface and/or side vents of the portable computer. Restricting the airflow may, in turn, cause the portable computer's internal cooling fan to draw more current and produce even more heat while attempting to flow enough air to keep the computer cool. Therefore, if the portable computer is running on battery power, battery life may also be reduced.

SUMMARY OF THE INVENTION

The present disclosure teaches computer carrying, cooling and support devices. Exemplary embodiments are provided.

An exemplary embodiment combined carrying, cooling and support device for a portable electronic unit is provided, including: a flexible cushioned cooler having a base portion, at least one angled side portion disposed at an acute angle relative to the base portion, and an integrated cooling fan; an attachment mechanism disposed about the periphery of the flexible cushioned cooler; and an upper cover removably attachable to the flexible cushioned cooler by the attachment mechanism, wherein the flexible cushioned cooler is configured to form an elongated cooling air channel between its base portion, its at least one angled side portion, and a bottom surface of the portable electronic unit.

Another exemplary embodiment is provided wherein the integrated fan is configured to intake air axially through the flexible cushioned cooler and push the air towards the bottom surface of the portable electronic unit, and wherein the cooling air channel is configured to redirect the air from the bottom surface of the unit outwards through open sides of the cooler at the ends of the elongated channel. Another exemplary embodiment is provided wherein the flexible cushioned cooler includes at least one elongated slot substantially parallel to the elongated channel, the at least one elongated slot disposed in the at least one angled side portion for permitting a limited portion of cooling air to flow perpendicular to the elongated channel towards the front or back of the electronic unit. Yet another exemplary embodiment is provided wherein the flexible cushioned cooler includes a flexible ethylene vinyl acetate (EVA) molded pad laminated with fabric.

A further exemplary embodiment is provided, further comprising at least one of an external pocket, a workstation enclosure, an internal file pocket, an accessory pocket, a support stand, a handle, or a carrying strap attached to the upper cover. Another exemplary embodiment is provided wherein the flexible cushioned cooler includes at least one molded recess for accepting the fan or cables thereto.

Still another exemplary embodiment is provided wherein the flexible cushioned cooler further includes a second angled side portion disposed at an acute angle relative to the base portion wherein the first and second angled side portions are each disposed at an acute angle of about 15 degrees relative to the base portion. Another exemplary embodiment is provided wherein the flexible cushioned cooler includes two elongated slots substantially parallel to the elongated channel, the first elongated slot disposed in the first angled side portion for permitting a limited portion of cooling air to flow perpendicular to the elongated channel towards the back of the electronic unit, and the second elongated slot disposed in the second angled side portion for permitting a limited portion of cooling air to flow perpendicular to the elongated channel towards the front of the electronic unit. Yet another exemplary embodiment is provided wherein the two elongated slots each have a membrane of remaining material such that they do not extend entirely through the flexible cushioned cooler from top to bottom.

A different exemplary embodiment combined carrying, cooling and support device for a portable electronic unit is provided, including: a flexible cushioned cooler having a base portion, at least one angled side portion disposed at an acute angle relative to the base portion, and an integrated cooling fan; a lower cover having an attachment mechanism disposed about its periphery, the lower cover configured to conformably receive the flexible cushioned cooler; and an upper cover removably attachable to the lower cover by the attachment mechanism, wherein the flexible cushioned cooler is configured to form an elongated cooling air channel between its base portion, its at least one angled side portion, and a bottom surface of the portable electronic unit.

Another exemplary embodiment is provided wherein the integrated fan is configured to intake air axially through the flexible cushioned cooler and push the air towards the bottom surface of the portable electronic unit, and wherein the cooling air channel is configured to redirect the air from the bottom surface of the unit outwards through open sides of the cooler at the ends of the elongated channel. Still another exemplary embodiment is provided wherein the flexible cushioned cooler includes at least one elongated slot substantially parallel to the elongated channel, the at least one elongated slot disposed in the at least one angled side portion for permitting a limited portion of cooling air to flow perpendicular to the elongated channel towards the front or back of the electronic unit. Yet another exemplary embodiment is provided wherein the flexible cushioned cooler includes a flexible ethylene vinyl acetate (EVA) molded pad laminated with fabric.

A further exemplary embodiment is provided, further comprising at least one of an external pocket, a workstation enclosure, an internal file pocket, an accessory pocket, a support stand, a handle, or a carrying strap attached to at least one of the upper or lower covers. Another exemplary embodiment is provided wherein the flexible cushioned cooler includes at least one molded recess for accepting the fan or cables thereto.

Yet another exemplary embodiment is provided wherein the flexible cushioned cooler further includes a second angled side portion disposed at an acute angle relative to the base portion. Another exemplary embodiment is provided wherein the first and second angled side portions are each disposed at an acute angle of about 15 degrees relative to the base portion. Still another exemplary embodiment is provided wherein the flexible cushioned cooler includes two elongated slots substantially parallel to the elongated channel, the first elongated slot disposed in the first angled side portion for permitting a limited portion of cooling air to flow perpendicular to the elongated channel towards the back of the electronic unit, and the second elongated slot disposed in the second angled side portion for permitting a limited portion of cooling air to flow perpendicular to the elongated channel towards the front of the electronic unit. Another exemplary embodiment is provided wherein the two elongated slots each extend entirely through the flexible cushioned cooler from top to bottom.

The present disclosure will be further understood from the following description of exemplary embodiments, which is to be read in connection with the accompanying drawings.

BRIEF DESCRIPTION OF THE DRAWINGS

The present disclosure provides computer carrying, cooling and support devices, where like reference numerals may refer to like elements in the following exemplary figures, in which.

DETAILED DESCRIPTION OF PREFERRED EMBODIMENTS

A computer carrying, cooling and support device is described herein. Exemplary embodiments include a cushioned cooling pad having an integrated fan, which serves as the lower side of a tote. A user may conveniently carry a portable computer within the computer carrying, cooling and support device, and use their portable computer upon the device to protect themselves from excessive heat while adequately cooling the computer itself.

A computer carrying, cooling and support device combines the functions of a soft-sided tote and a flexible cushioned cooler, where the cooler has an integrated cooling fan and forms an elongated cooling air passage along the bottom surface of the computer. The support device has a removable attachment, such as a zipper, along the perimeter of the flexible cushioned cooler, such that the upper cover of the case is removable from the cooler. An integrated fan is disposed through the bottom of the flexible cushioned cooler. Thus, the computer carrying, cooling and support device can effectively protect the computer during transit, comfortably support the computer during use, and cool the computer to protect its internal components, extend its battery life, and prevent excessive heat transfer to the user.

Some previous devices may have placed a highly conductive material in direct contact with the lower surface of the computer, and operated by conducting heat to the cooler, where the heat was chemically absorbed, radiated, or otherwise dissipated away from the user. In contrast, the presently disclosed device operates by forming an elongated integral airflow channel between the device and at least the lower surface of the portable computer, where the channel is used to draw heat away from the computer by convection.

Figure 1:
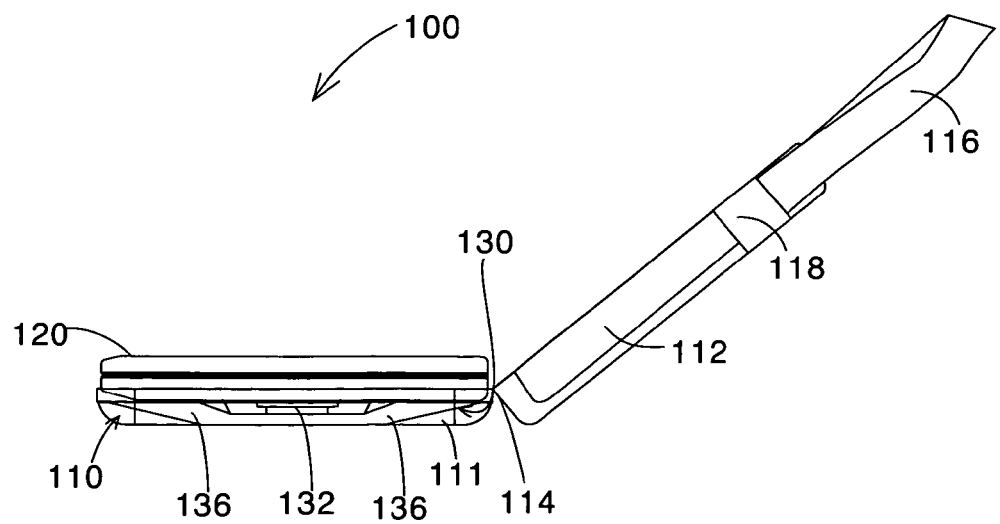
FIG. 1 shows an exploded schematic diagram in side view of a computer carrying, cooling and support device in accordance with a first exemplary embodiment of the present disclosure.

As shown in FIG. 1, a first embodiment computer carrying, cooling and support device is indicated generally by the reference numeral 100. The device includes a tote 110 having lower and upper portions 111 and 112, respectively, where the lower and upper portions are separably connected by a zipper 114, which acts as a hinge when partially unzipped. A carrying strap 116 is connected to the upper portion 112 at a boss or reinforcement 118.

The lower portion 111 conformably accepts an angular flexible cushioned cooler 130 having a fan 132. The angular flexible cushioned cooler 130 may be formed of ethylene vinyl acetate (EVA), for example, and optionally laminated with fabric on its top and/or bottom sides. The flexible cushioned cooler 130 includes angled sides 136, which are here disposed at an angle of about 15 degrees upwards. Likewise, the lower portion 111 has similarly angled sides to accept the cooler 130.

The fan 132 extends through an opening in the cooler 130. The lower portion 111 may be made of a breathable or porous material. Optionally, the lower portion 111 may have a matching opening, or be perforated or screened where it is adjacent to the fan. The angular flexible cushioned cooler 130, in turn, accepts a portable computer 120, and forms an elongated cooling channel between the computer 120 and the cooler 130. Thus, the computer 120 may be used with the cooler 130 when the cooler is resting in the lower portion 111 or when it is removed from the lower portion 111.

Figure 2:
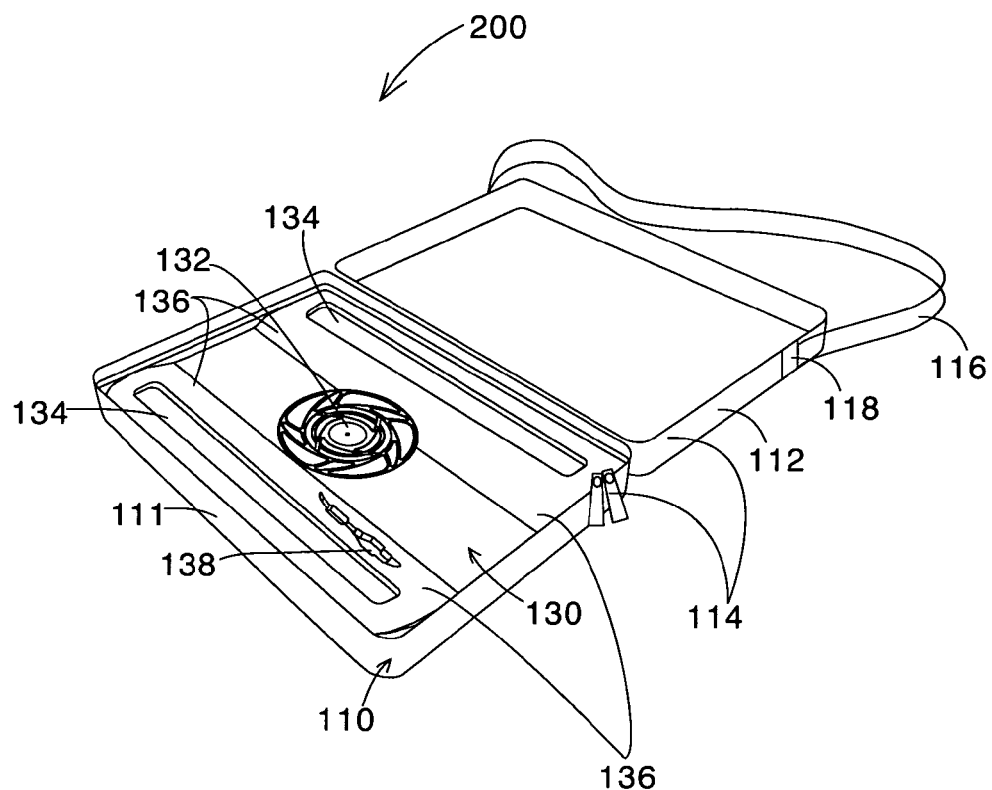
FIG. 2 shows a schematic diagram in perspective view of a computer carrying, cooling and support device in accordance with the first exemplary embodiment of the present disclosure.

Turning to FIG. 2, a computer carrying, cooling and support device is indicated here by the reference numeral 200. The device 200 is similar to the device 100 of FIG. 1, so duplicate description shall be omitted. In addition, the device 200 includes a cable storage impression 138, and front and rear elongated through-slots 134 in the flexible cushioned cooler 130. The through-slots permit the passage of air between the computer and the outside via the lower portion 111, which may be made of relatively porous or breathable material. Optionally, the material of the lower portion 111 may be slotted, perforated or screened in proximity to the slots 134. Thus, a continuous cooling air path is formed from the outside, through the slots, into the elongated passageway, and through the fan. It shall be understood that the fan may operate in either an intake or exhaust configuration, or both in alternate multi-fan embodiments.

Figure 3:
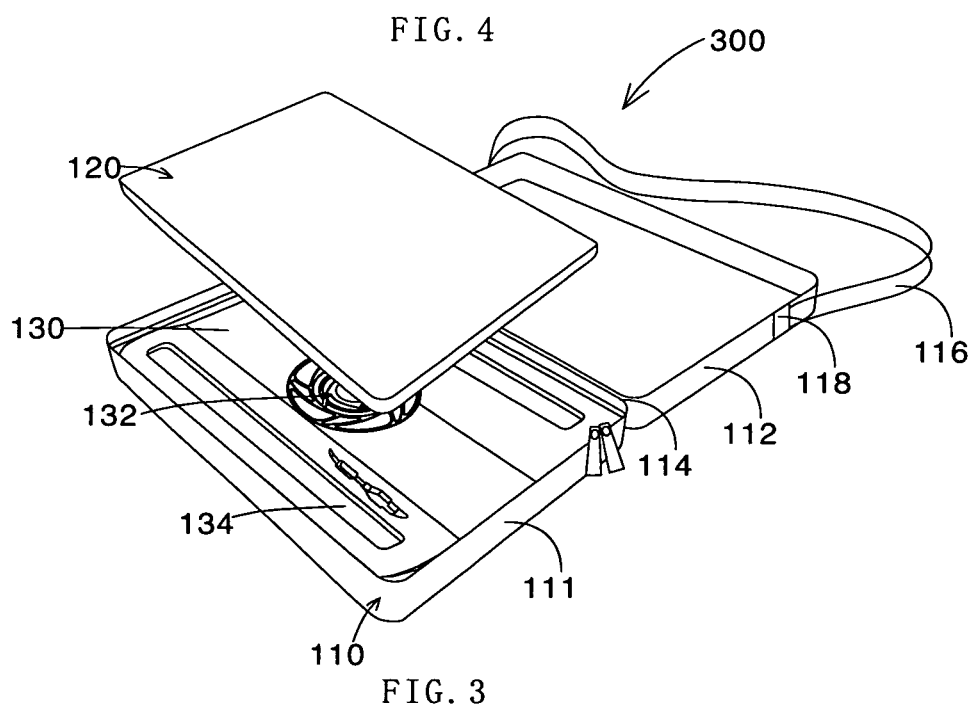
FIG. 3 shows a partially exploded schematic diagram in perspective view of a computer carrying, cooling and support device in accordance with the first exemplary embodiment of the present disclosure.

Turning now to FIG. 3, a computer carrying, cooling and support device is indicated here by the reference numeral 300. The device 300 is similar to the device 200 of FIG. 2, so duplicate description shall be omitted. As indicated, a portable computer 120 may be placed upon the flexible cushioned cooler 130, forming an elongated airflow channel between the computer 120 and the cooler 130.

With the fan 132 operating in an intake direction, air may flow in from the outside through the fan, transfer heat by convection from the bottom surface of the computer, and exit through the slots 134. With the fan operating in an exhaust direction, air may flow in from outside via the slots 134, transfer heat by convection from the bottom surface of the computer, and exit through the fan 132. In addition, air may enter or exit through the ends of the elongated path between the computer 120 and the cooler 130. These airflow paths are substantially operational whether the cooler 130 is resting in the lower portion 111, or placed outside of the lower portion.

Figure 4:
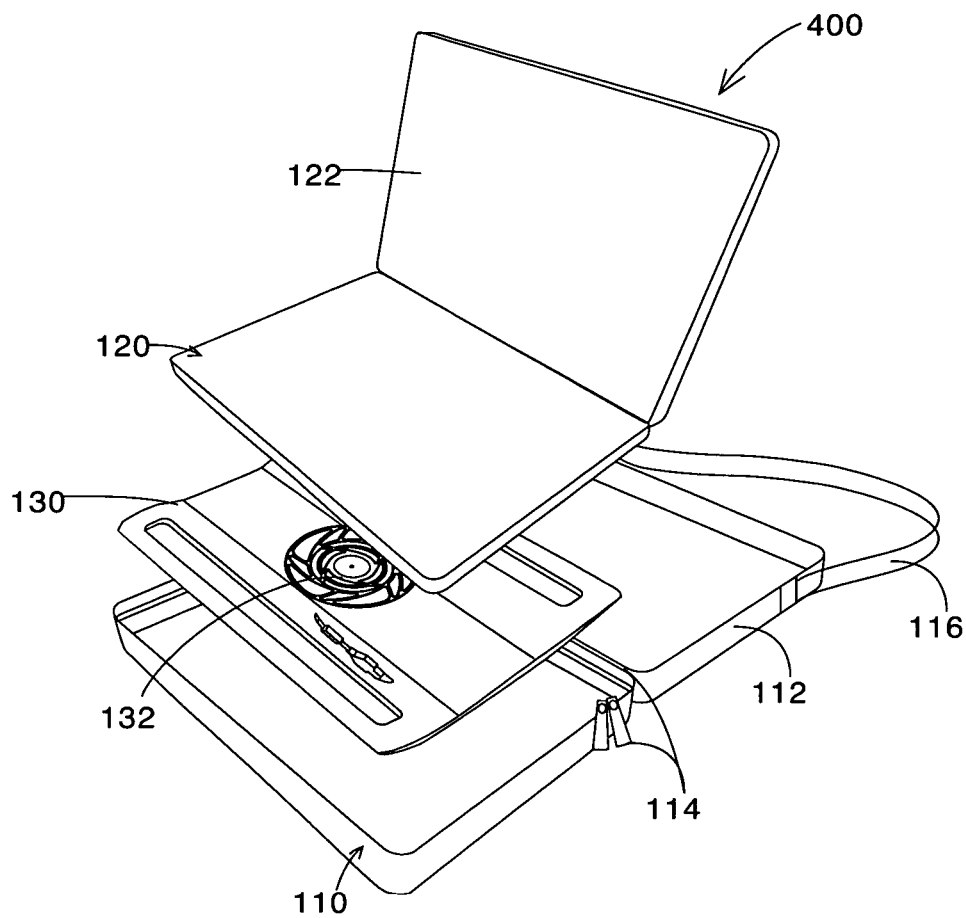
FIG. 4 shows an exploded schematic diagram in perspective view of a computer carrying, cooling and support device in accordance with the first exemplary embodiment of the present disclosure.

As shown in FIG. 4, a computer carrying, cooling and support device is indicated here by the reference numeral 400. The device 400 is similar to the device 300 of FIG. 3, so duplicate description shall be omitted. As indicated, a portable computer 120 may include a foldable display screen 122. The foldable display screen 122 may be opened when the upper portion 112 is at least partially unfastened, such as with the zipper 114, from the lower portion 111. Thus, the computer 120 may be operated upon the cooler 130 without removing either from the lower portion 111.

Figure 5:
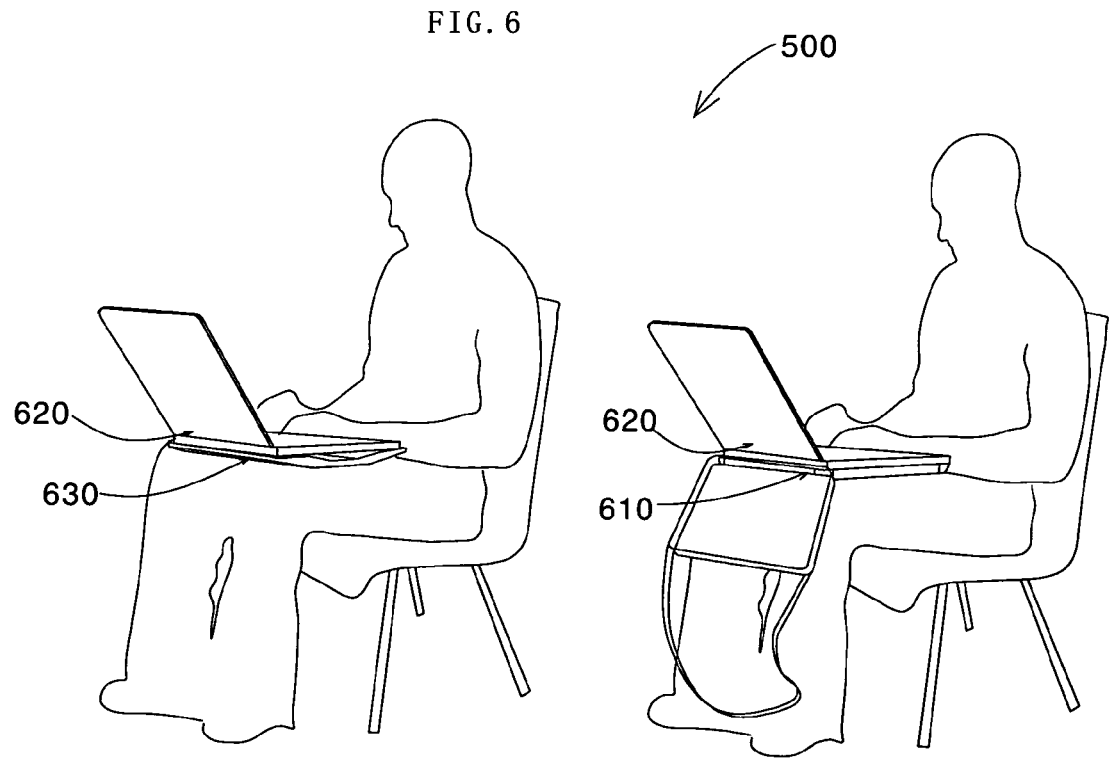
FIG. 5 shows schematic diagrams in perspective view of a user with computer carrying, cooling and support device in accordance with a second exemplary embodiment of the present disclosure.

Turning to FIG. 5, computer carrying, cooling and support devices are indicated here by the reference numeral 500. As indicated, a portable computer 620 may be operated in conjunction with a supportive flexible cushioned cooler 630 upon a users lap. In addition, the portable computer 620 may be operated in conjunction with the flexible cushioned cooler without removing either from the carrying device 610. The flexible cushioned cooler 630 may be formed of EVA, for example, and optionally laminated with fabric on its top and/or bottom sides.

Figure 6:
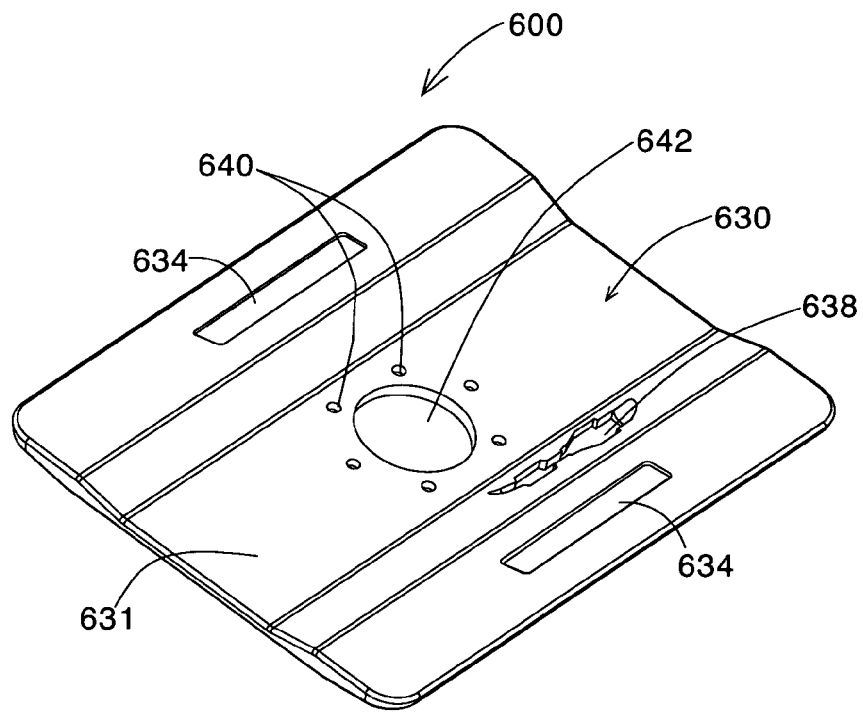
FIG. 6 shows a schematic diagram in top perspective view of a flexible cushioned cooler component in accordance with the second exemplary embodiment of the present disclosure.

Turning now to FIG. 6, the flexible cushioned cooler 630 of FIG. 5 is shown here in greater detail, and indicated generally by the reference numeral 600. The cooler 630 includes a planar base portion 631, front and rear non-through slots 634, a cable storage impression 638, fan fastener mounting holes 640, and a substantially circular fan opening 642.

Figure 7:
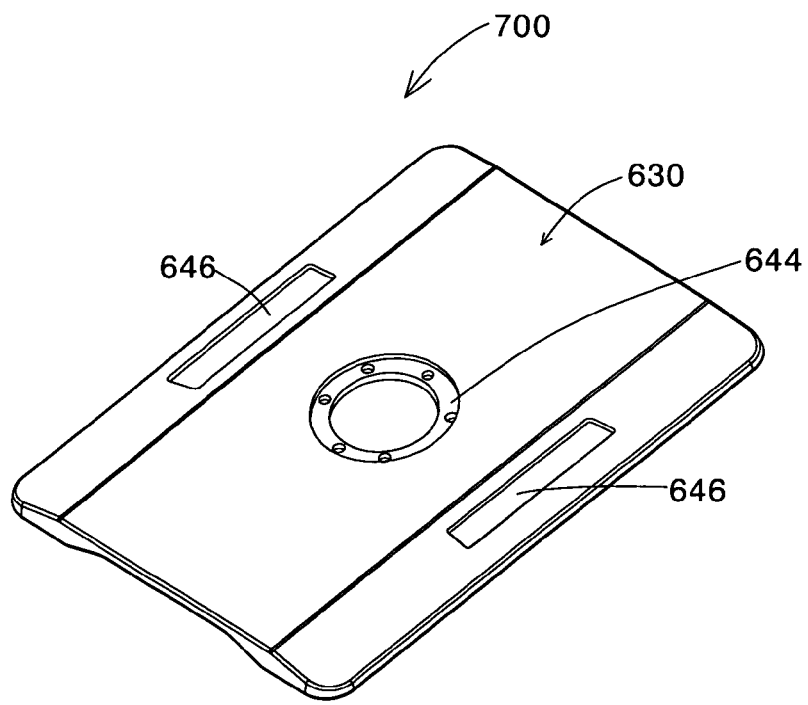
FIG. 7 shows a schematic diagram in bottom perspective view of a flexible cushioned cooler component in accordance with the second exemplary embodiment of the present disclosure.

As shown in FIG. 7, the flexible cushioned cooler 630 of FIG. 6 is shown here in an inverted bottom view, and indicated generally by the reference numeral 700. As shown, the bottom of the cooler 630 includes a fan clearance land 644 about the bottom edge of the fan opening, and additional non-through front and rear slots 646 disposed opposite of the top slots. Thus, the material between the top slots and the bottom slots 646 is substantially thinner than the remainder of the flexible cushioned cooler 630, and may reasonably act as an air filtration device.

Figure 8:
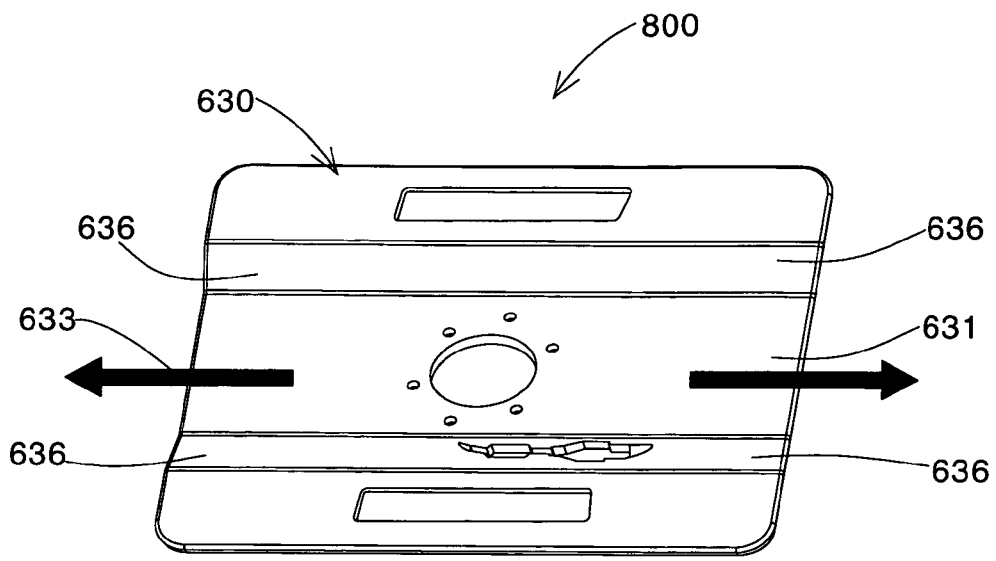
FIG. 8 shows a schematic diagram in front perspective view of a flexible cushioned cooler component in accordance with the second exemplary embodiment of the present disclosure.

Turning to FIG. 8, the flexible cushioned cooler 630 of FIG. 7 is shown here in a top front view, and indicated generally by the reference numeral 800. As shown, the cooler includes a substantially flat base 631, an elongated airflow channel 633, and angled side portions 636. The angled side portions may be angled from about 5 degrees to about 45 degrees relative to the base, and are preferably angled at about 15 degrees when formed of EVA having a thickness between about 0.75 to about 1.5 inches thick.

FIG. 8 is an isometric top view showing an ethylene vinyl acetate (EVA) molded surface of a pad laminated with fabric, includes a hole for a fan and USB cable with an on and off switch.

Figure 9:
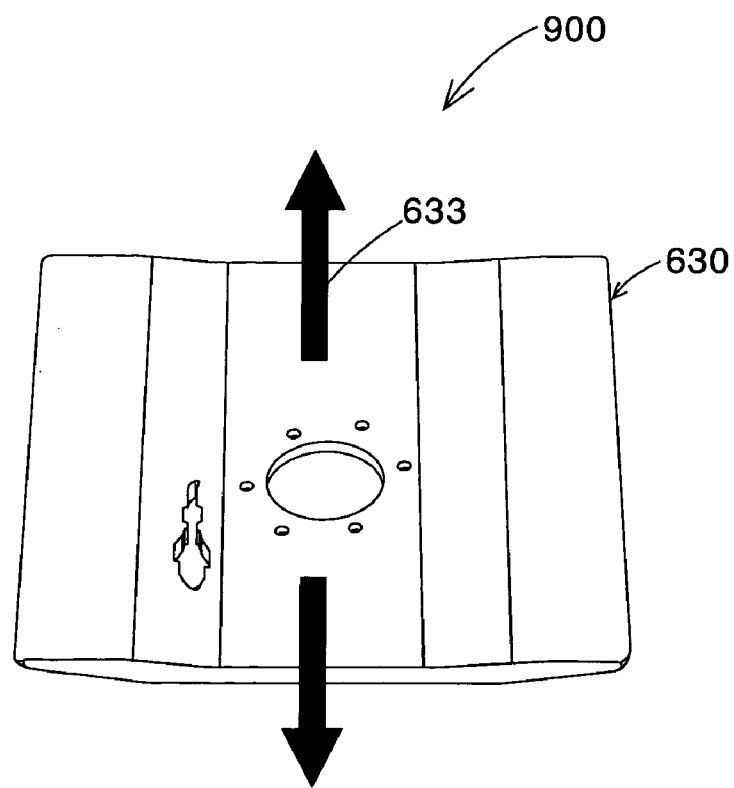
FIG. 9 shows a schematic diagram in end perspective view of a flexible cushioned cooler component in accordance with the second exemplary embodiment of the present disclosure.

Turning now to FIG. 9, the flexible cushioned cooler 630 of FIG. 8 is shown here in a top end view, and indicated generally by the reference numeral 900. As shown, the cooler 630 includes an elongated air channel 633, which has its top boundary defined by the bottom surface of a portable computer. The elongated air channel 633 extends from the fan opening for an intake mode fan, and to the fan opening for an exhaust mode fan.

Figure 10:
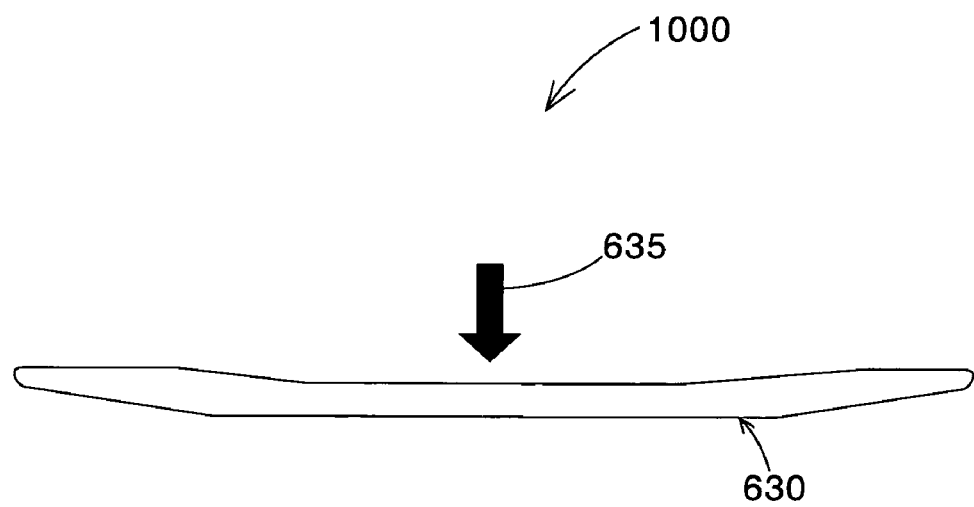
FIG. 10 shows a schematic diagram in end view of a flexible cushioned cooler component in accordance with the second exemplary embodiment of the present disclosure.

As shown in FIG. 10, the flexible cushioned cooler 630 of FIG. 9 is shown here in an end view, and indicated generally by the reference numeral 1000. As shown, the cooler 630 includes an airflow passage through the fan opening, which is indicated here for exhaust mode flow.

Figure 11:
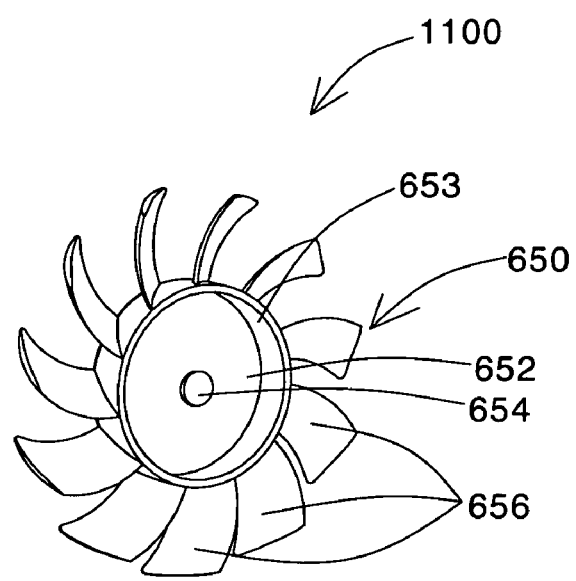
FIG. 11 shows a schematic diagram in perspective view of a fan impeller in accordance with the second exemplary embodiment of the present disclosure.

Turning to FIG. 11, a partial fan assembly is indicated generally by the reference numeral 1100. The assembly includes a fan impeller 650 and a securing fastener 654 located on the axis of rotation, which secures the impeller to an electric motor. The impeller shown is designed for counter-clockwise rotation (looking towards the page). Thus, the single fastener 654 may be a reverse or left-hand threaded unit if the motor is to be attached at the front. For alternate embodiment bi-directional fans and impellers, it is preferable to use either a non-threaded fastener, or multiple threaded fasteners offset from the axis of rotation.

The impeller 650 includes a center disk portion 652, a raised cylindrical lip portion 653 extending from the perimeter of the center disk, and curved impeller blades 656. The curvature of the impeller blades assists in providing a more laminar airflow, and in reducing noise and vibration caused by more turbulent airflow.

Figure 12:
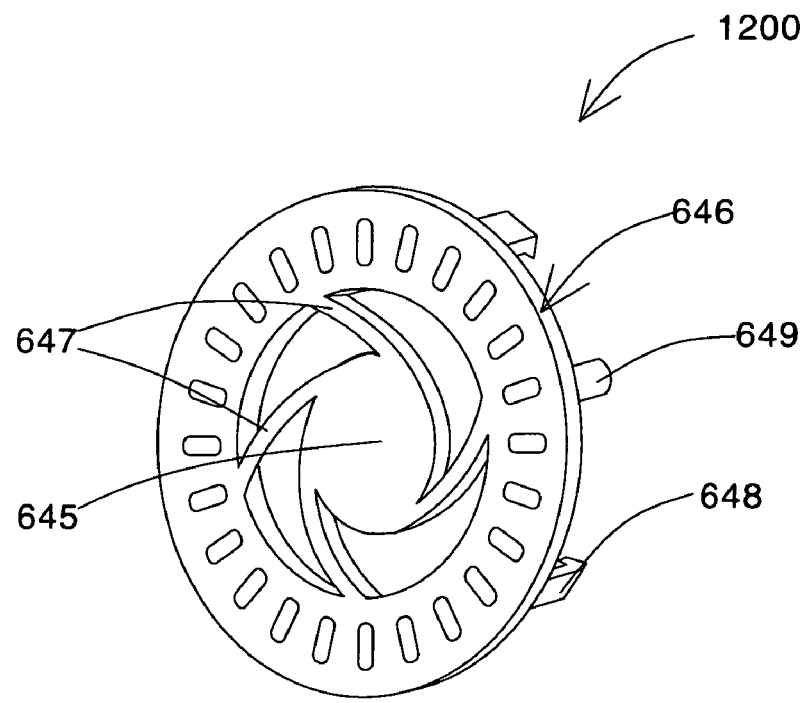
FIG. 12 shows a schematic diagram in perspective view of a bottom fan cover in accordance with the second exemplary embodiment of the present disclosure.

Turning now to FIG. 12, another fan component is indicated generally by the reference numeral 1200. Here, the component is a lower fan cover plate 646, which will face towards the ground in the finished combination. The cover plate 646 includes a center disk 646, tangential support fingers 647, locating tabs 648, and threaded fastener recesses 649. Although four support fingers are shown, three or more support fingers are preferably provided to support adequate structural integrity without unnecessarily restricting airflow.

Figure 13:
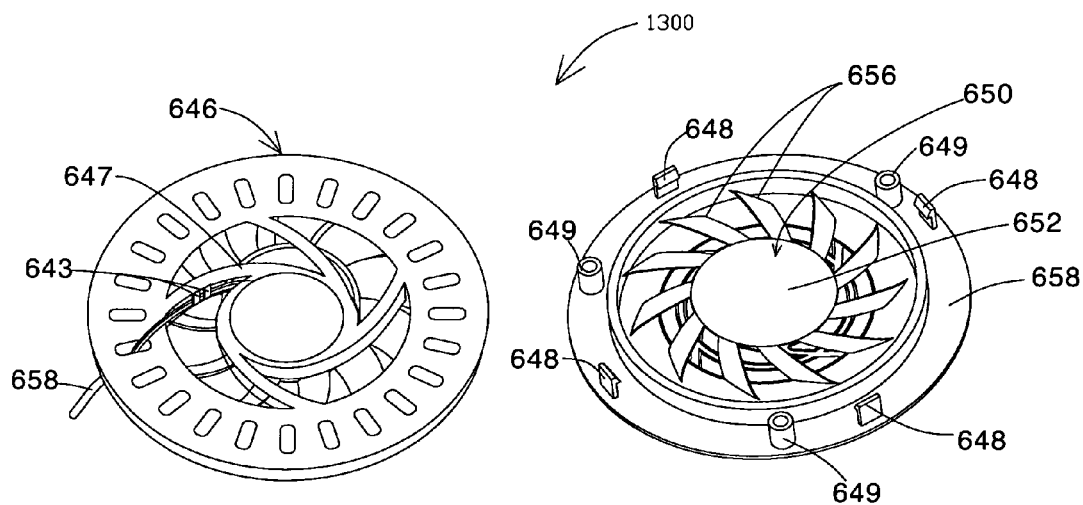
FIG. 13 shows schematic diagrams with top and bottom views of a partial fan assembly in accordance with the second exemplary embodiment of the present disclosure.

As shown in FIG. 13, a partial fan assembly is indicated generally by the reference numeral 1300. The assembly 1300 incorporates the impeller 650 of FIG. 11 and the lower cover plate 646 of FIG. 12, so duplicate description shall be omitted. In addition, power supply wires 658 are connected to the fan, and located by holding tabs 643 extending circumferentially from one of the tangential support fingers 647. As assembled, this fan is configured as an intake fan.

Figure 14:
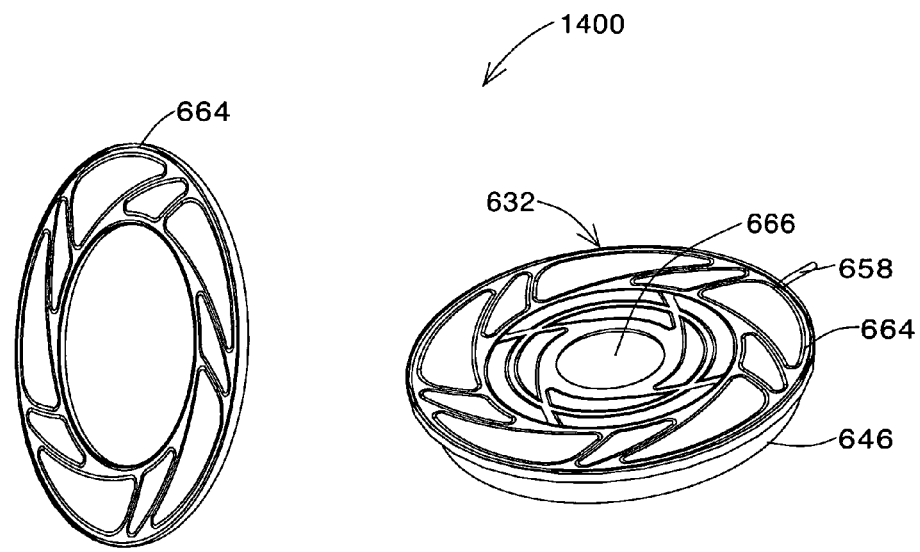
FIG. 14 shows schematic diagrams with top and perspective views of a fan assembly in accordance with the second exemplary embodiment of the present disclosure.

Turning to FIG. 14, a complete fan assembly is indicated generally by the reference numeral 1400. Here, the fan 632 includes the partial assembly 1300 of FIG. 13, so duplicate description shall be omitted. A top cover ring 664 is now attached to the top of the fan 632, preferably after the fan is inserted into the opening in the flexible cushioned cooler, which is omitted here for clarity. In addition, a centering support section 666 is disposed over the fan 632 in the center of the ring 664, generally to protect the fan mechanism from dropped object intrusion during use.

Figure 15:
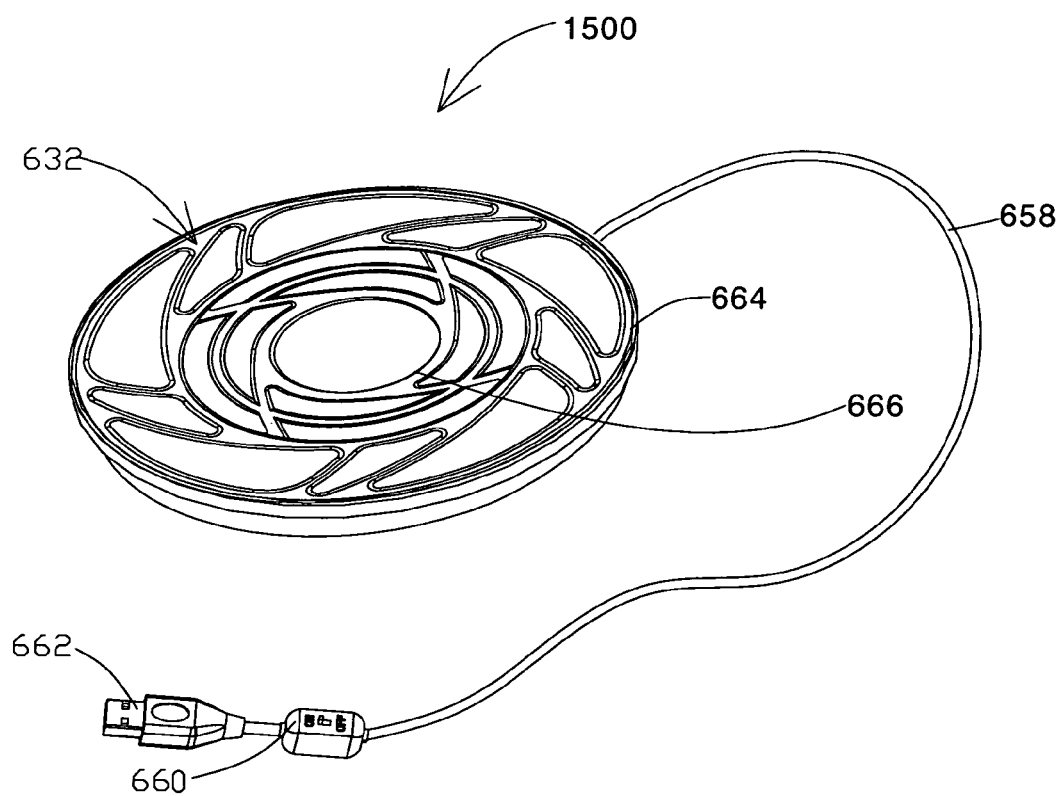
FIG. 15 shows a schematic diagram in perspective view of a fan assembly with power cord in accordance with the second exemplary embodiment of the present disclosure.

Turning now to FIG. 15, the fan assembly 632 of FIG. 14 is shown in greater detail, an indicated here by the reference numeral 1500. As shown, the power cord 658 of the fan 632 is connected to a switch 660, which, in turn, is connected to a standard universal serial bus (USB) male connector 662. The fan 632 may further include a printed circuit board assembly (PCBA), which may, in turn, include optional components such as a temperature sensor, a power conditioning and/or noise filtering integrated circuit (IC), or an alternate power supply module.

Figure 16:
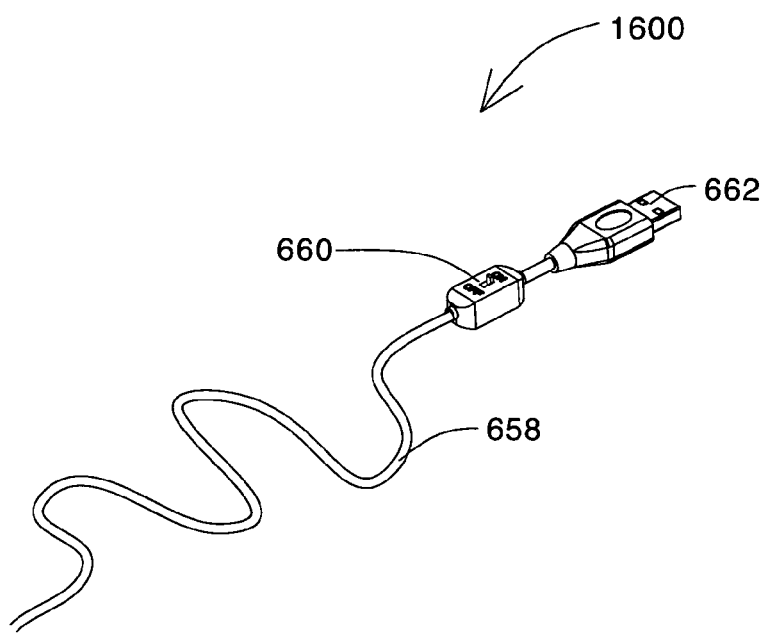
FIG. 16 shows a schematic diagram in perspective view of a fan power cord with switch and connector in accordance with the second exemplary embodiment of the present disclosure.

As shown in FIG. 16, the cable end assembly of FIG. 15 is shown in greater detail, and indicated here by the reference numeral 1600. Here, the switch 660 is a single pole, single throw (SPST) type for simple on/off operation. In alternate embodiments, the switch may be a double pole, double throw (DPDT) with center off type for intake/off/exhaust operation. The USB connector 662 may be a single USB 5V cable as shown, or it may optionally be a Y-cable with two male USB connectors to draw sufficient current from two low capacity ports, for example.

Figure 17:
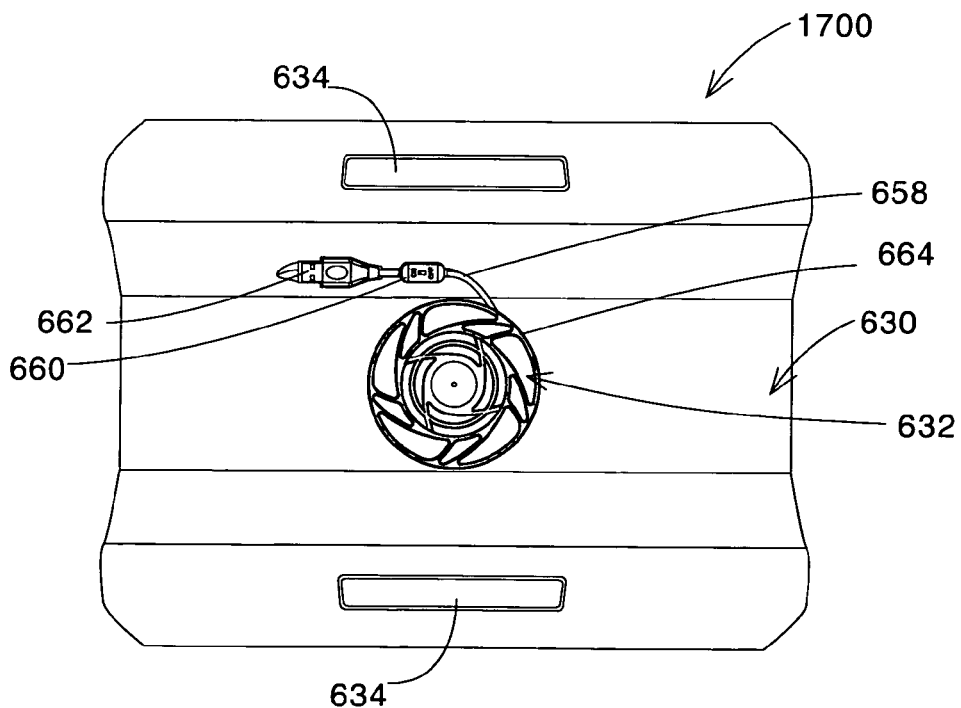
FIG. 17 shows a schematic diagram in top view of a flexible cushioned cooler with fan in accordance with the second exemplary embodiment of the present disclosure.

Turning to FIG. 17, a top view of a cooler and fan assembly is indicated generally by the reference numeral 1700. Here, the flexible cushioned cooler 630 includes non-through cut front and rear upper slots 634, and a fan 632. The fan includes a switch 660 and a male USB connector 662. Any excess length of the cord or cable 658 may be wrapped underneath the top grill or ring 664 for cable storage.

Figure 18:
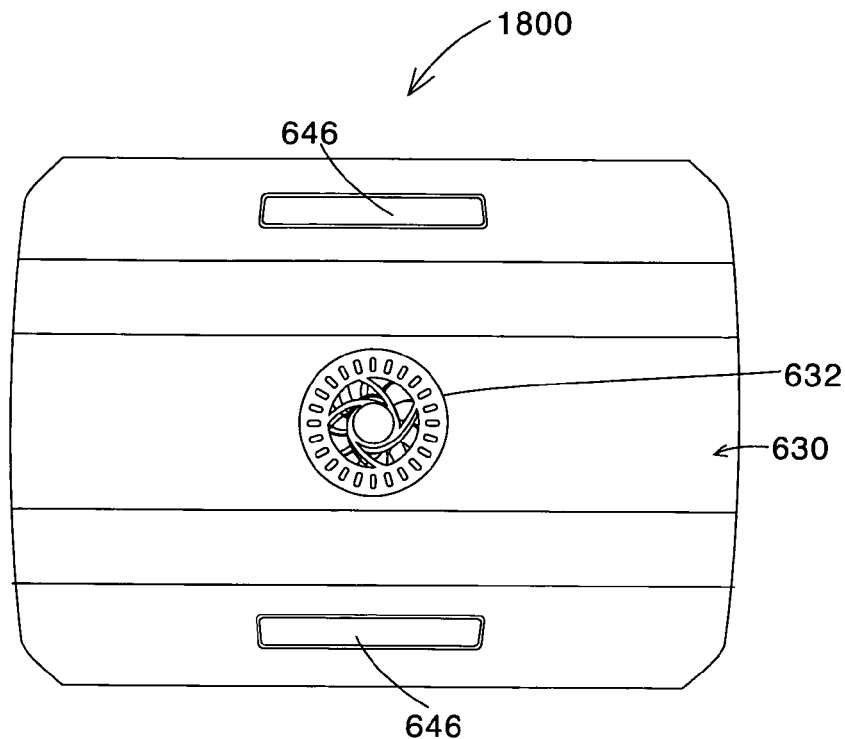
FIG. 18 shows a schematic diagram in bottom view of a flexible cushioned cooler with fan in accordance with the second exemplary embodiment of the present disclosure.

Turning now to FIG. 18, a bottom view of a cooler and fan assembly is indicated generally by the reference numeral 1800. Here, the flexible cushioned cooler 630 includes non-through cut front and rear lower slots 646, and a fan 632. The lower slots 646 are disposed opposite the upper slots 634 of FIG. 17, with just a thin membrane of material remaining between the lower and upper slots. The thin membrane separating the slots may be used as a cooling air filtration system.

Figure 19:
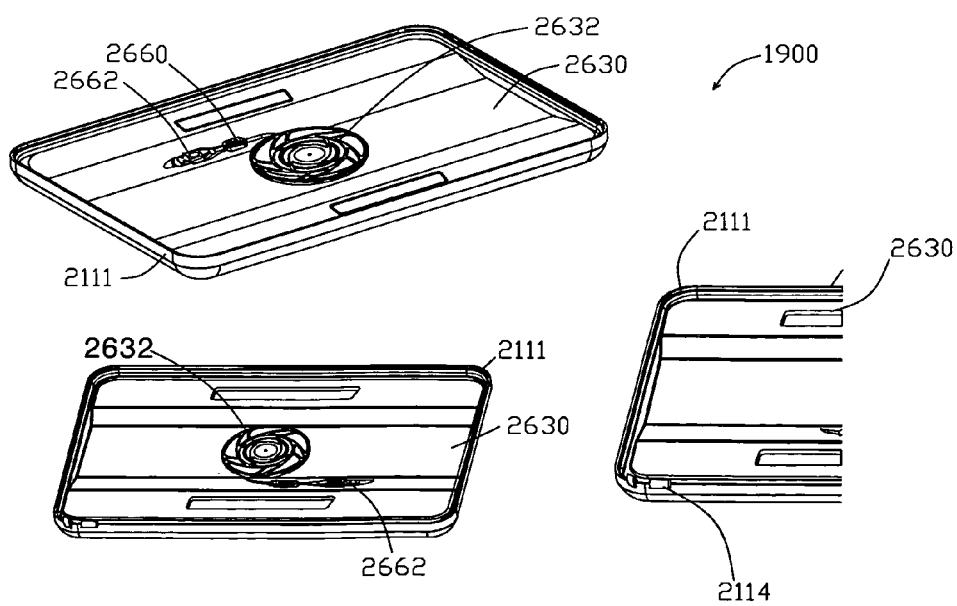
FIG. 19 shows schematic diagrams in top perspective views of a flexible cushioned cooler with fan in accordance with the second exemplary embodiment of the present disclosure.

As shown in FIG. 19, a computer carrying, cooling and support device with upper portion removed is indicated generally by the reference numeral 1900. Here, the device includes a flexible cushioned cooler 2630, which is also the base of the device. A thin lower zipper tape portion or ridge 2111 surrounds the periphery of the cooler 2630, but does not extend beneath it. The lower zipper tape ridge 2111 is permanently attached to the cooler 2630, and includes one side of an elongated fastener or zipper 2114, preferably excluding the zipper head.

The cooler 2630 includes a fan 2632, the fan having a switch 2660 connected to a male USB connector 2662. A male USB connector is preferably used, as it interfaces to most current portable computers. However, it shall be understood that alternate embodiments may have different connectors, whether single for direct connection to a computer, or hub for connection to more than one device.

Figure 20:
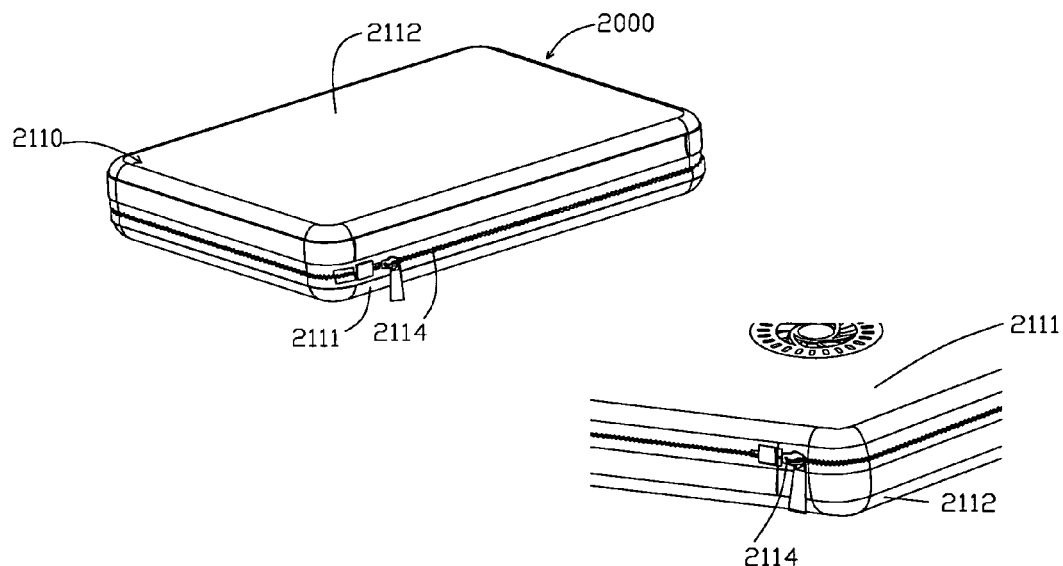
FIG. 20 shows schematic diagrams in top and bottom perspective views of a computer carrying, cooling and support device in accordance with the second exemplary embodiment of the present disclosure.

Turning to FIG. 20, the computer carrying, cooling and support device of FIG. 19 is now shown with upper portion attached, and generally indicated by the reference numeral 2000. The device of FIG. 20 is similar to that of FIG. 19, so duplicate description shall be omitted. Here, the device 2110 includes an upper portion 2112 including a matching fastener or zipper 2114, where the zipper 2114 fastens the upper portion 2112 to the lower ridge 2111 of the cooler 2630.

Figure 21:
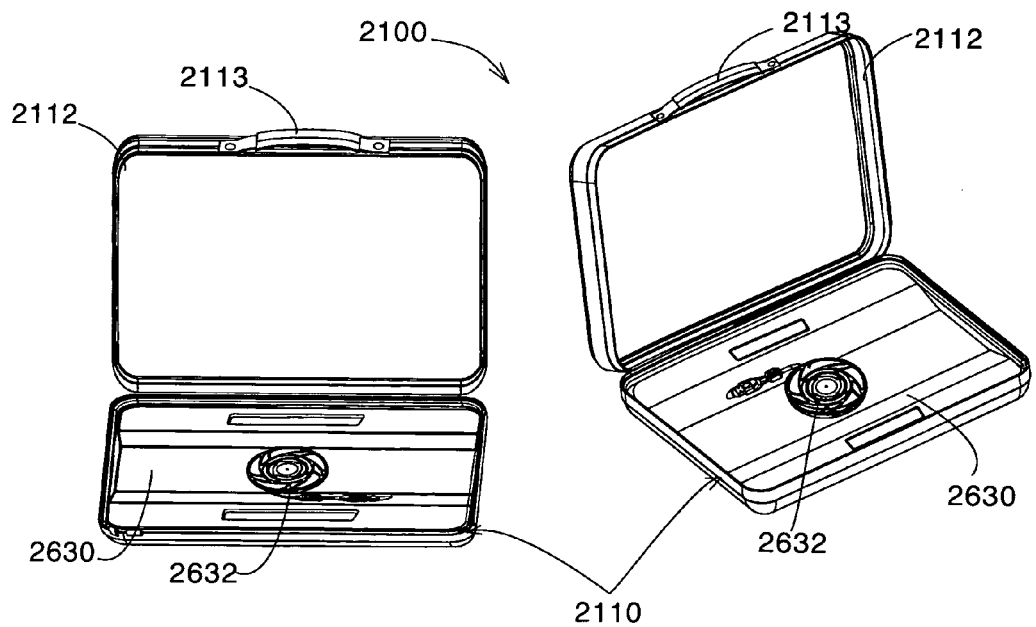
FIG. 21 shows schematic diagrams in top perspective views of a computer carrying, cooling and support device in accordance with the second exemplary embodiment of the present disclosure.

Turning now to FIG. 21, the computer carrying, cooling and support device of FIG. 20 is now shown in an opened position, and generally indicated by the reference numeral 2100. The device of FIG. 21 is similar to that of FIG. 20, so duplicate description shall be omitted. Here, the device 2110 includes the cooler 2630 having the fan 2632, the upper portion 2112, and a handle 2113 affixed to the upper portion.

Figure 22:
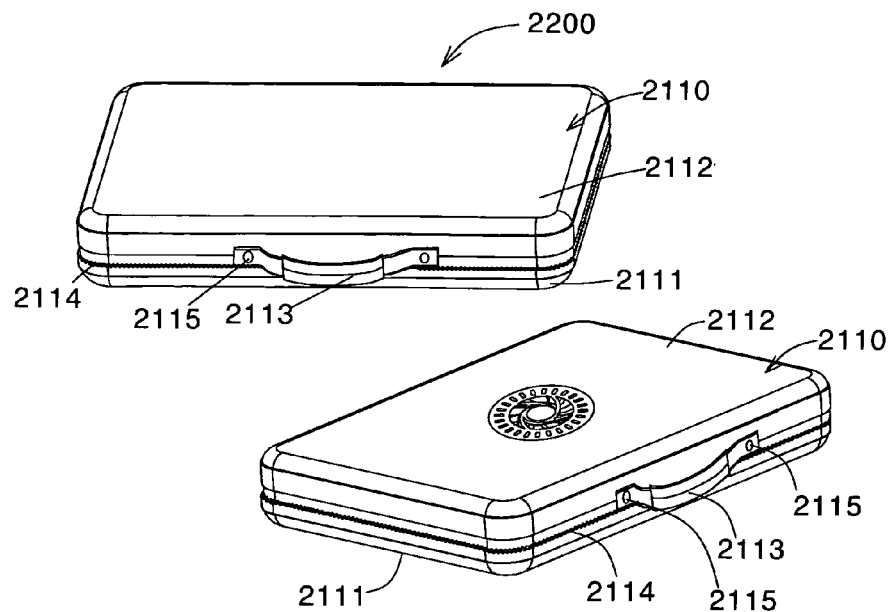
FIG. 22 shows schematic diagrams in top perspective views of a computer carrying, cooling and support device in accordance with the second exemplary embodiment of the present disclosure.

As shown in FIG. 22, the computer carrying, cooling and support device of FIG. 21 is now shown in a closed position, and generally indicated by the reference numeral 2200. The device of FIG. 22 is similar to that of FIG. 21, so duplicate description shall be omitted. Here, the device 2110 includes gusseted fasteners 2115 securing the handle 2113 to the upper portion 2112.

Figure 23:
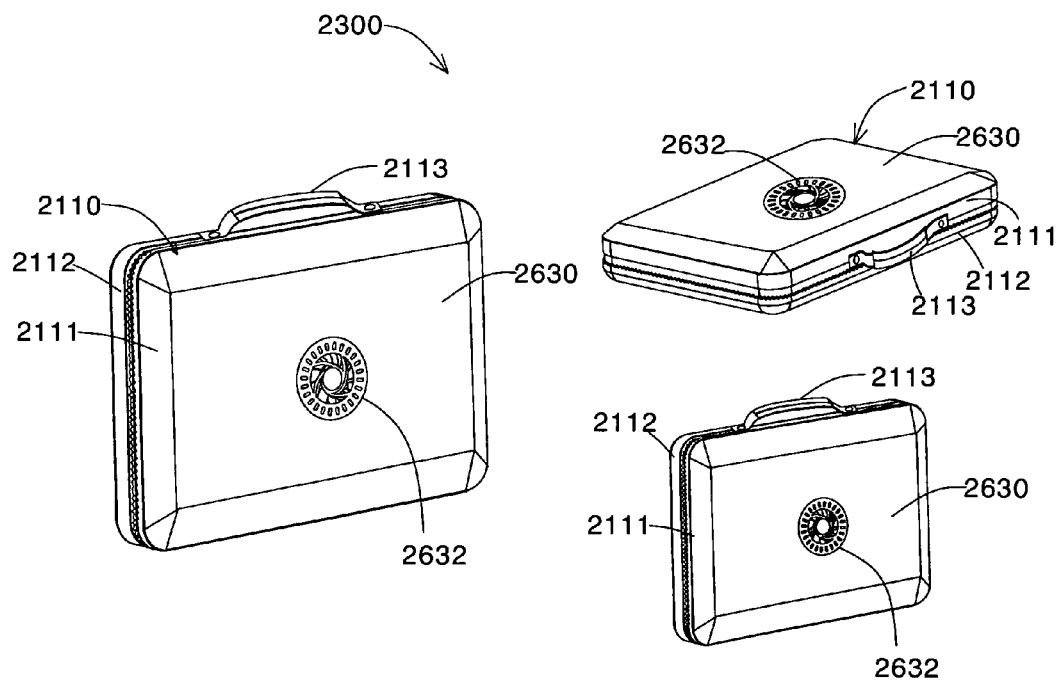
FIG. 23 shows schematic diagrams in bottom and side perspective views of a computer carrying, cooling and support device in accordance with the second exemplary embodiment of the present disclosure.

Turning to FIG. 23, the computer carrying, cooling and support device of FIG. 22 is now shown in a vertical upright or carrying position, and generally indicated by the reference numeral 2300. The device of FIG. 23 is similar to that of FIG. 22, so duplicate description shall be omitted. Here, the device 2110 is shown to have the lower portion of its fan assembly 2632 exposed at all times.

Thus, the fan 2632 may be operated even when the computer is not in active use. This may be particularly advantageous when the computer is in a standby or reduced power state, but not completely off. It shall be understood that the fan may be powered from the computer's USB port, or from an alternate power source in this configuration. The alternate power source may include rechargeable batteries, and a solar and/or motion-based charging system. The rechargeable batteries may be AAA or AA size and be incorporated into the fan housing, or they may be virtually any size embedded in cooler and/or located in the carrying device.

Further, the cooler may be equipped with an integral temperature sensor. The fan may have an automatic closed-loop operating mode responsive to the sensor, and automatically begin cooling only when the temperature sensor detects a computer temperature above an absolute preset threshold, and/or above a preset threshold relative to outside or ambient air.

Figure 24:
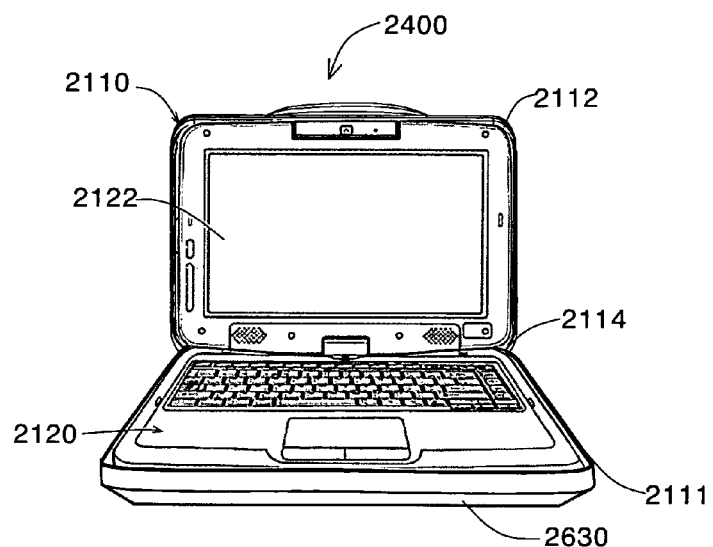
FIG. 24 shows a schematic diagram in top perspective view of a computer carrying, cooling and support device with inserted portable computer in accordance with the second exemplary embodiment of the present disclosure.

Turning now to FIG. 24, the computer carrying, cooling and support device of FIG. 23 is now shown in an opened position with computer, and generally indicated by the reference numeral 2400. The device of FIG. 24 is similar to that of FIG. 23, so duplicate description shall be omitted. Here, the device 2110 has a portable computer 2120 seated in the cooler 2630. The upper portion 2112 of the device is partially opened, and hinged by a portion of the zipper 2114. Thus, a display screen 2122 of the computer may be fully raised without removing the computer or upper portion 2112.

Figure 25:
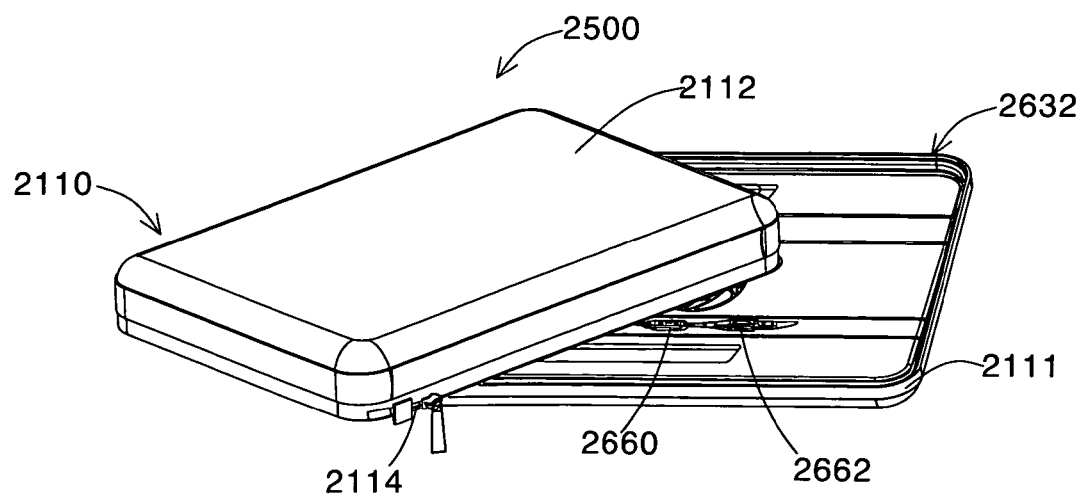
FIG. 25 shows a schematic diagram in top perspective view of a computer carrying, cooling and support device in accordance with the second exemplary embodiment of the present disclosure.

As shown in FIG. 25, the computer carrying, cooling and support device of FIG. 24 is now shown with upper portion completely disconnected, and generally indicated by the reference numeral 2500. The device of FIG. 25 is similar to that of FIG. 24, so duplicate description shall be omitted. Here, the device 2110 includes the cooler 2632, lower ridge 2111, fan switch 2660, USB power connector 2662, unzipped zipper 2114, and completely disconnected upper cover 2112. The upper cover is shown resting on the cooler 2632, but offset therefrom as made possible by its complete disconnection.

Figure 26:
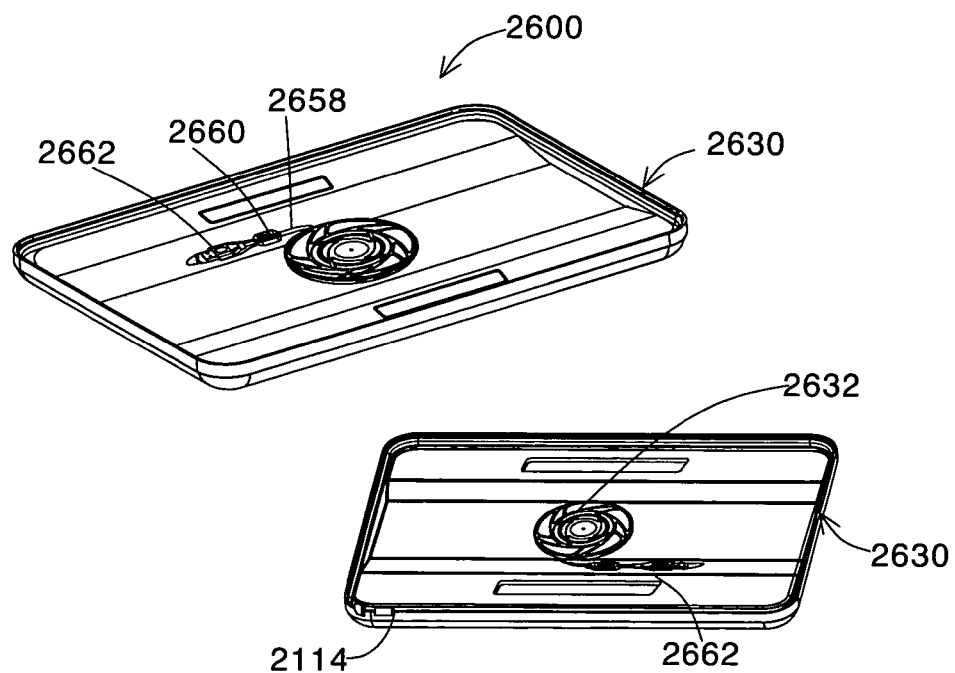
FIG. 26 shows schematic diagrams in top perspective views of a computer carrying, cooling and support device in accordance with the second exemplary embodiment of the present disclosure.

Turning to FIG. 26, the computer carrying, cooling and support device of FIG. 25 is now shown without upper cover portion, and generally indicated by the reference numeral

2600. The device of FIG. 26 is similar to that of FIG. 25, so duplicate description shall be omitted. Here, the cooler 2630 includes a portion of the zipper track 2114 without the zipper handle, which stayed with the removed upper portion, and a fan 2632. The fan includes a power cord 2658, a switch 2660, and a USB power connector 2662.

Figure 27:
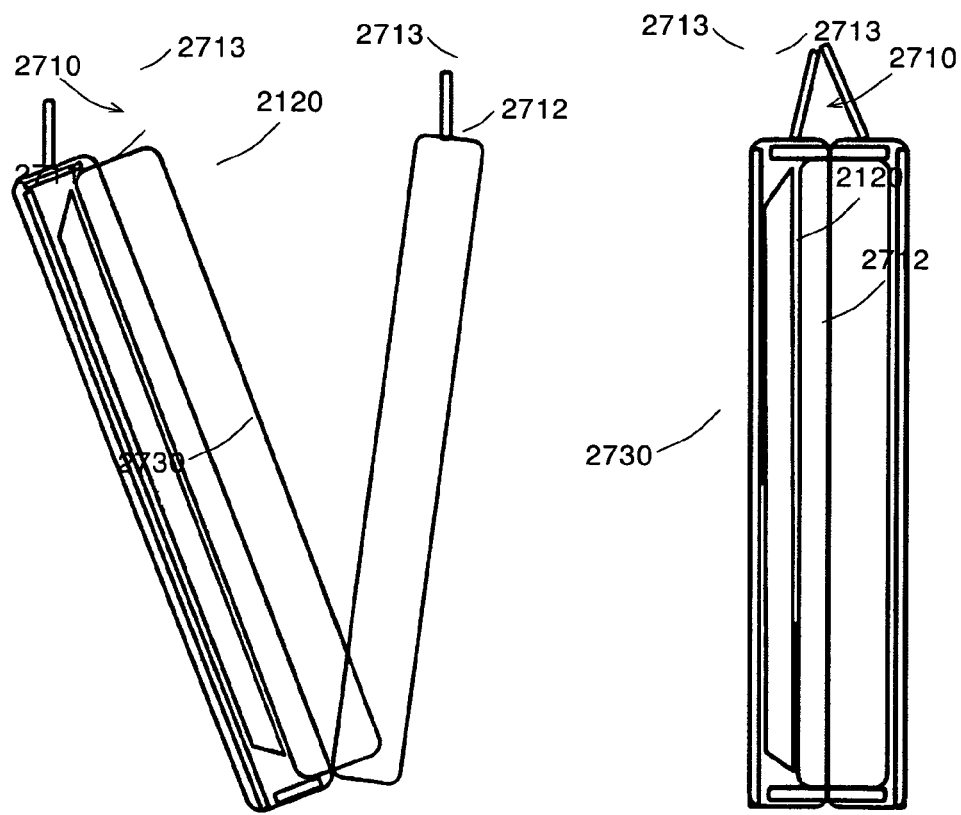
FIG. 27 shows a schematic diagram in front view of a computer carrying, cooling and support device in accordance with another embodiment similar to the first exemplary embodiment of the present disclosure.

Turning now to FIG. 27, another embodiment computer carrying, cooling and support device is indicated generally by the reference numeral 2700. The device of FIG. 27 is similar to the devices of FIGS. 1 through 4, so duplicate description may be omitted. Here, the device 2710 includes a full lower portion 2711, an enclosed EVA cooler 2730, a notebook computer 2120, a detachable upper portion 2712, and handles 2713 affixed to each of the upper and lower portions.

Figure 28:
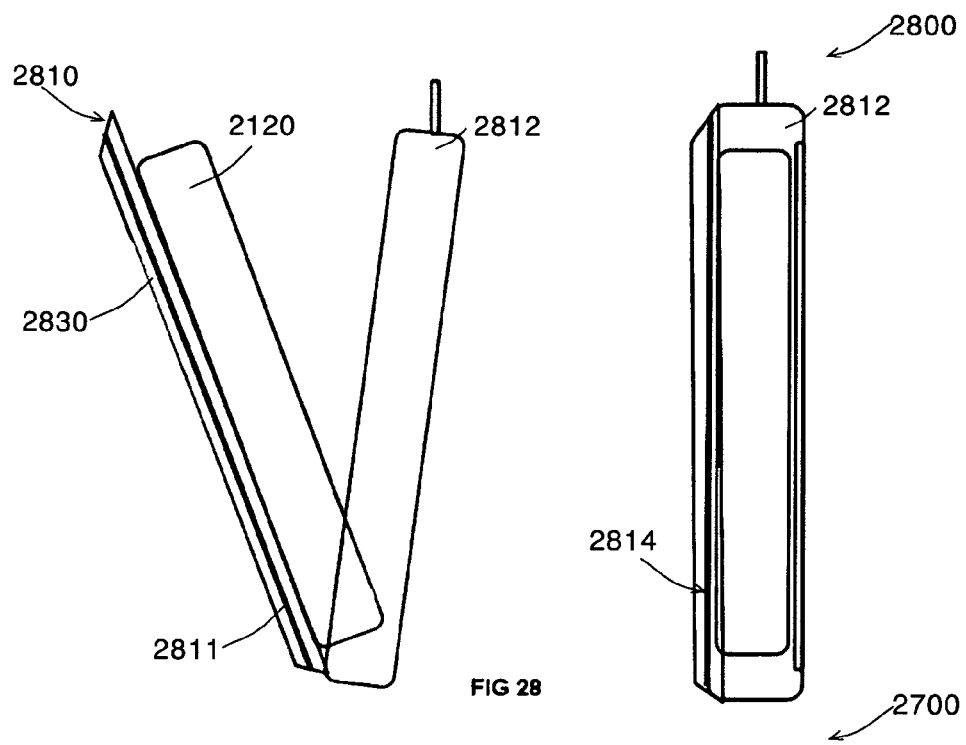
FIG. 28 shows a schematic diagram in front view of a computer carrying, cooling and support device in accordance with another embodiment similar to the second exemplary embodiment of the present disclosure.

As shown in FIG. 28, another embodiment computer carrying, cooling and support device is indicated generally by the reference numeral 2800. The device of FIG. 28 is similar to the devices of FIGS. 5 through 26, so duplicate description may be omitted. Here, the device 2810 includes a zipper-track lower ridge 2811, an attached EVA cooler 2830, a notebook computer 2120, a detachable upper portion 2812, and a zipper 2814.

Figure 29:
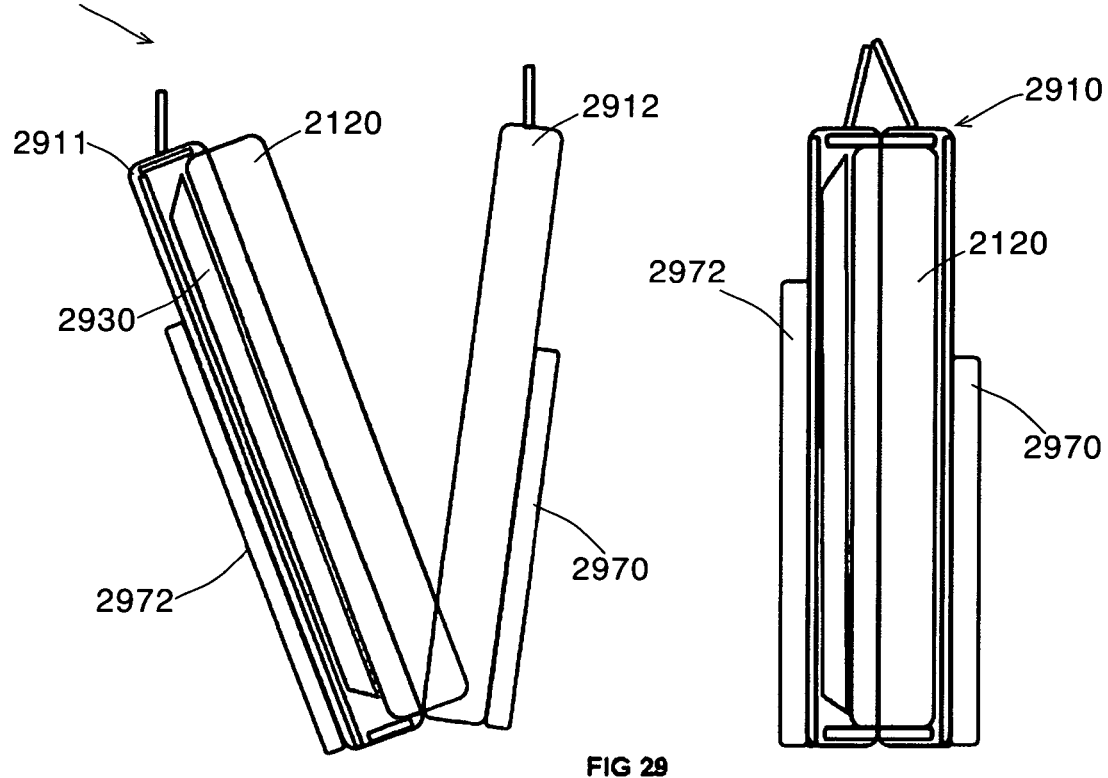
FIG. 29 shows a schematic diagram in front view of a computer carrying, cooling and support device in accordance with another embodiment similar to the first exemplary embodiment of the present disclosure.

Turning to FIG. 29, another embodiment computer carrying, cooling and support device is indicated generally by the reference numeral 2900. The device of FIG. 29 is similar to that of FIG. 27, so duplicate description shall be omitted. Here, the device 2910 further includes an upper external pocket 2970 affixed to the upper portion 2912, and a lower external pocket 2972 affixed to the lower portion 2911.

Figure 30:
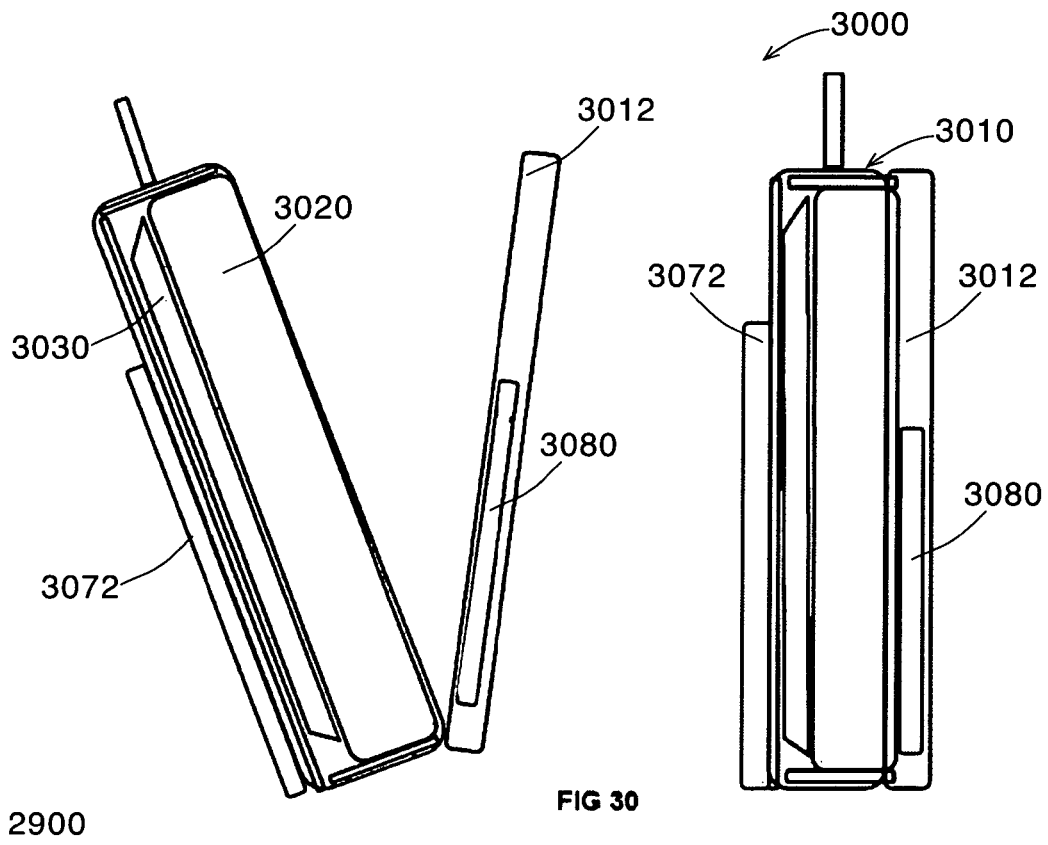
FIG. 30 shows a schematic diagram in front view of a computer carrying, cooling and support device in accordance with another embodiment similar to the first exemplary embodiment of the present disclosure.

Turning now to FIG. 30, another embodiment computer carrying, cooling and support device is indicated generally by the reference numeral 3000. The device of FIG. 30 is similar to that of FIG. 27, so duplicate description shall be omitted. Here, the device 3010 further includes an upper workstation 3080 disposed inside the upper portion 3012, and a lower external pocket 3072 affixed to the lower portion 3011.

Figure 31:
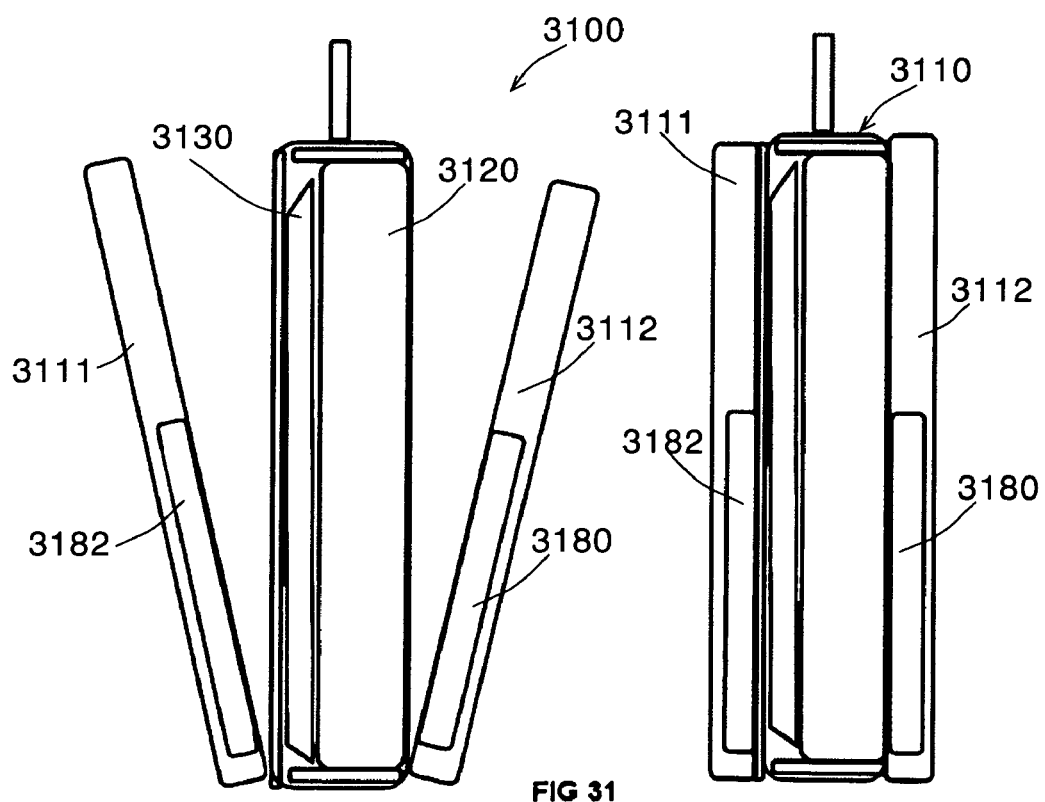
FIG. 31 shows a schematic diagram in front view of a computer carrying, cooling and support device in accordance with another embodiment similar to the first exemplary embodiment of the present disclosure.

As shown in FIG. 31, another embodiment computer carrying, cooling and support device is indicated generally by the reference numeral 3100. The device of FIG. 31 is similar to that of FIG. 27, so duplicate description shall be omitted. Here, the device 3110 further includes an upper workstation 3180 disposed inside the upper portion 3112, and a lower workstation 3182 disposed inside the lower portion 3111.

Figure 32:
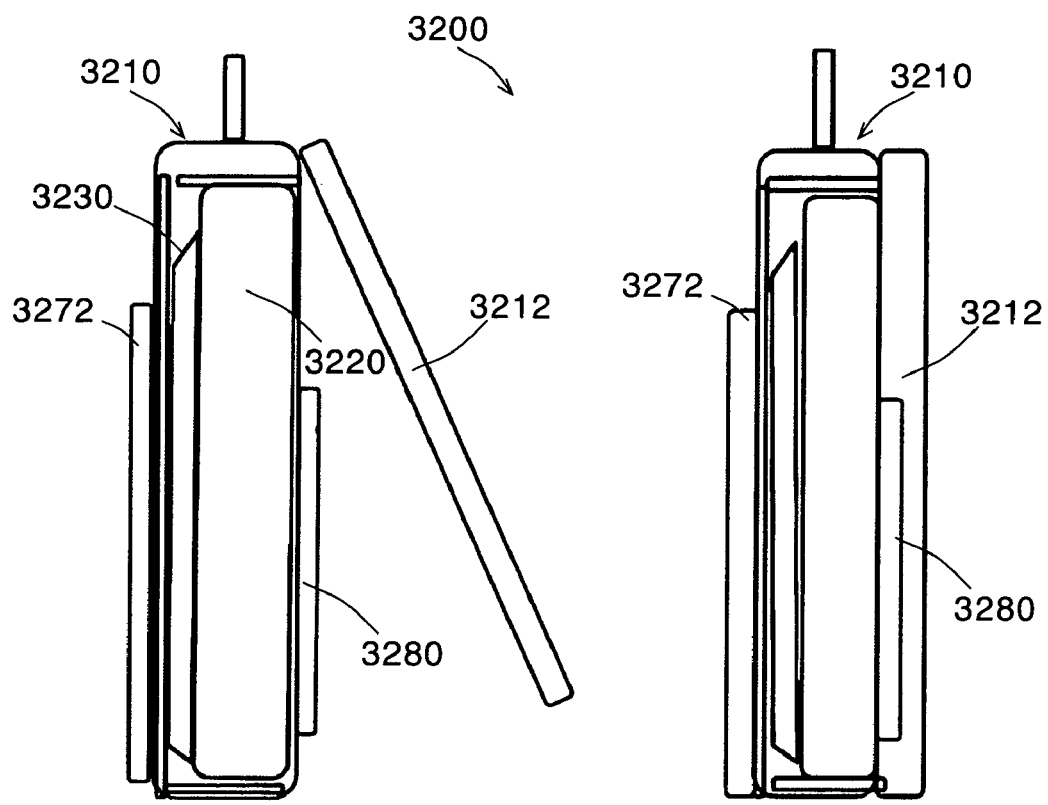
FIG. 32 shows a schematic diagram in front view of a computer carrying, cooling and support device in accordance with another embodiment similar to the first exemplary embodiment of the present disclosure.

Turning to FIG. 32, another embodiment computer carrying, cooling and support device is indicated generally by the reference numeral 3200. The device of FIG. 32 is similar to that of FIG. 27, so duplicate description shall be omitted. Here, the device 3210 further includes an upper workstation 3280 disposed on the upper portion 3212, a top-hinged front flap extending from the top of the upper portion 3212, and a lower external pocket 3272 affixed to the lower portion 3211.

Figure 33:
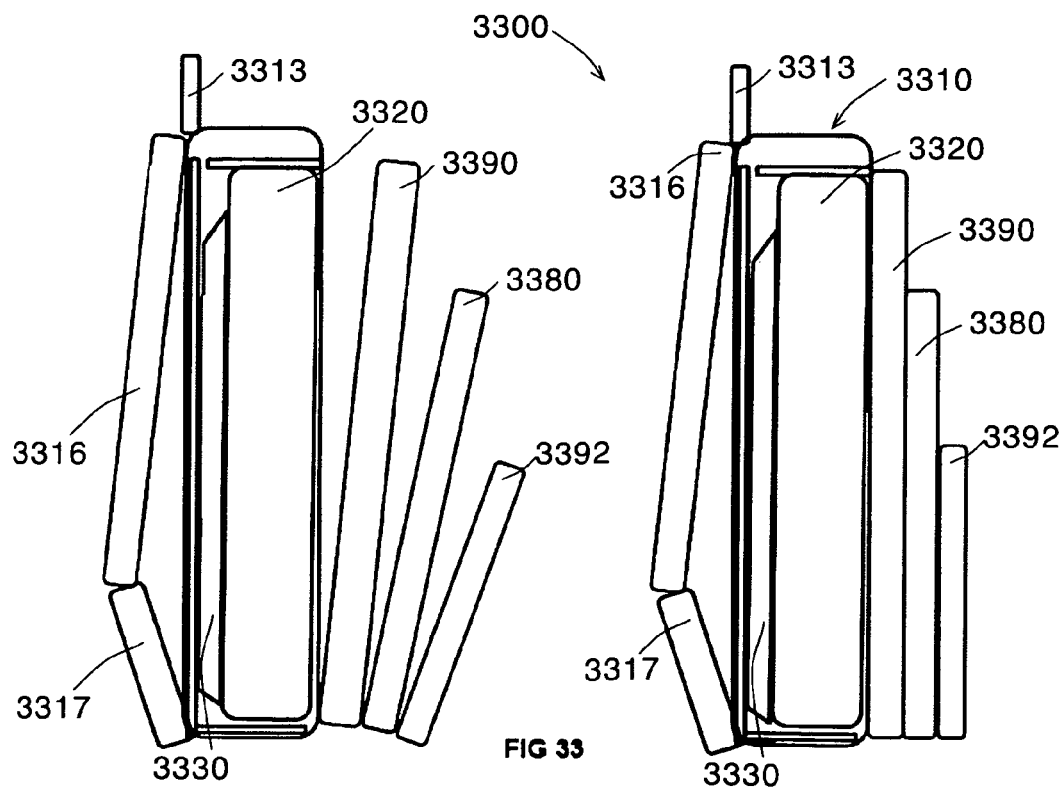
FIG. 33 shows a schematic diagram in front view of a computer carrying, cooling and support device in accordance with another embodiment similar to the first exemplary embodiment of the present disclosure.

Turning now to FIG. 33, another embodiment computer carrying, cooling and support device is indicated generally by the reference numeral 3300. The device of FIG. 33 is similar to that of FIG. 27, so duplicate description shall be omitted. Here, the device 3310 further includes a bottom-hinged upper internal file pocket 3390 attached to the upper portion, a bottom-hinged workstation pocket 3380 attached to the internal file pocket, a bottom-hinged accessory pocket 3392 attached to the workstation pocket, a shoulder strap 3316 attached to the lower portion, and a waist pad 3317 attached to the shoulder strap and to the lower portion.

Figure 34:
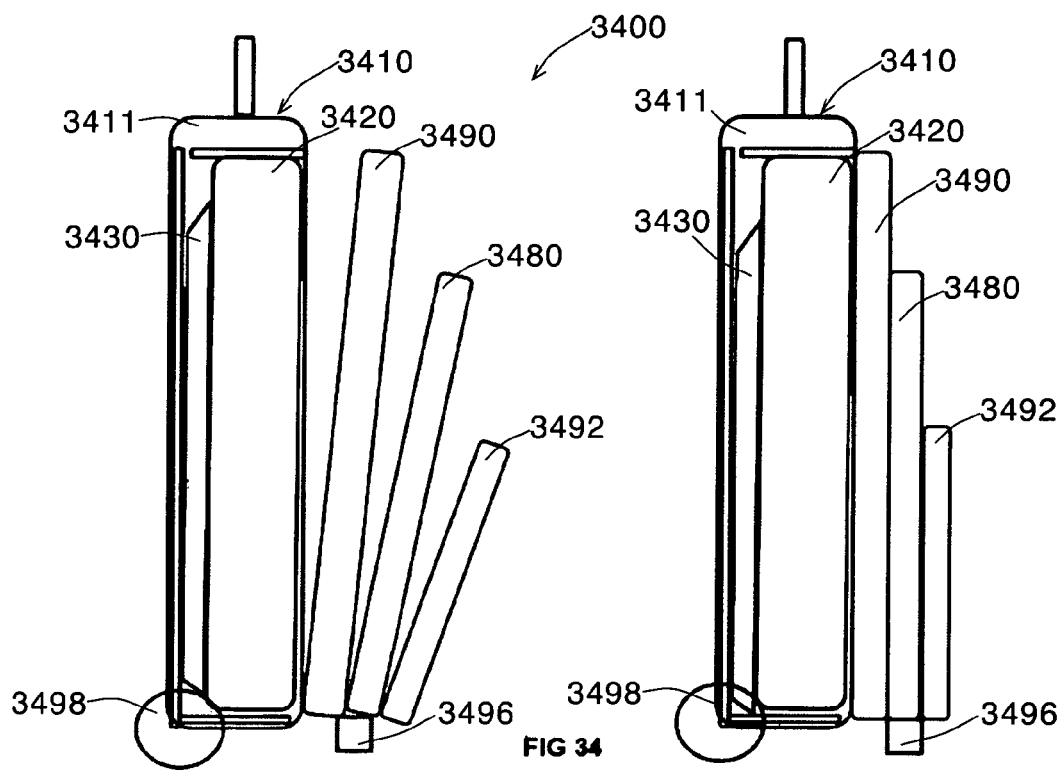
FIG. 34 shows a schematic diagram in front view of a computer carrying, cooling and support device in accordance with another embodiment similar to the first exemplary embodiment of the present disclosure.

Turning now to FIG. 34, another embodiment computer carrying, cooling and support device is indicated generally by the reference numeral 3400. The device of FIG. 34 is similar to that of FIG. 33, so duplicate description shall be omitted. Here, the device 3410 omits the shoulder strap and waist pad of FIG. 33, but includes wheels 3498 disposed at two lower corners, and an upright support 3496 disposed beneath the workstation.

Alternate embodiments are contemplated. For example, the device 2810 of FIG. 28, which is similar to the second embodiment 610 of FIGS. 5 through 25, may be modified along the lines of FIGS. 28 through 34 with the exception of the bottom external pocket or bottom-mounted workstation.

Other alternate embodiment computer carrying, cooling and support devices may have a female docking area, zipper, hook and loop, or snap connection for integrating the cushioned cooling pad with an upper case cover. The integrated fan may be attached to the flexible cushioned cooler with threaded fasteners, hook and loop fasteners, or adhesive, for example. A user may use the computer carrying, cooling and support device with their portable computer in or upon it.

The integrated flexible cushioned cooler that is in the computer carrying, cooling and support device can be taken out/unzipped/unsnapped, and then placed on a lap to provide a protective barrier between the lap and the heat generated by the portable device. The flexible cushioned cooler with integrated fan may, depending on the carrying case design (e.g., sleeve, slip case or single gusset carrying case), be left in the carrying device and be used directly on the lap, in conjunction with the portable computer. That is, there is no need to remove the cushioned cooling pad from these devices.

When the flexible cushioned cooler with integrated fan is in the case docking area or lower portion of the computer carrying, cooling and support device, and the portable computer is placed against it and the case is zipped and/or buckled up for transport, the cushioned material that the cooling pad is made from doubles as protective shock absorption for the portable computer. During drops and/or physical bumping of the carrying device, the enclosed portable computer is thereby protected from damage by the flexible cushioned cooler.

The flexible cushioned cooler of the computer carrying, cooling and support device may be made in a layered format, shaped from ethylene vinyl acetate (EVA), memory foam, neoprene and/or other types of materials. The printed circuit board assembly (PCBA) may be incorporated into the fan, incorporated into the USB connector and/or switch, or embedded in the cooler.

The top and bottom grills of the fan help keep foreign objects, such as pens, pencils, errant fingers, bed spreads, sheets, comforters, and/or pillows from being caught while the fan is in use. The fan is preferably operated in an air intake direction, which is more likely to push out or reject anything dropped in from above. If the fan were instead operated in an air exhaust direction, it would be more likely to jam on dropped objects.

The top surface coating material, which may be selected to meet design and/or color preferences, may be nylon, twill, leather, cotton, silicon, rubber, neoprene, polyester, polyurethane (PU), polyvinyl chloride (PVC), thermoplastic rubber (TPR) or the like. In addition, other cross materials may be applied directly by laminating, zipping, snapping or fastening.

The flexible cushioned cooler molded design includes an angled air channel disposed in the middle horizontal position to allow the airflow from the fan to convect heat produced by the portable computer away from a user's body. The air flow channel preferably angles downward from the north and south vertical side edges at about a 15 degree angle, and then levels off in the middle, to create a channel for sufficient airflow. The airflow channel runs horizontally east and west to keep the air flow away from the user's body or lap. Thus, the majority of heated air is pushed out from the sides in the same plane as the portable computer. This angled channel additionally facilitates cable management and storage for the USB cable and switch.

The USB cable is attached to the fan housing and PCBA, and any excess may be wrapped underneath the protective plastic top grill housing in the approximately 0.25 inches of ring land space provided there. The USB connector with the on/off switch housing fits into a molded area in the top of the flexible cushioned cooler. This may prevent loss or tangling of loose cables when traveling, for example.

The exemplary embodiments disclosed herein provide cooling protection for portable computers when in use, and shock protection for portable computers during transit. The material from which the flexible cushioned cooler is formed may be the same inter-lining protective material that is used throughout the carrying device, or have comparable shock absorption properties. One or more fans and/or cooling electronics that provide air movement are embedded in the flexible cushioned cooler to provide the necessary air movement for the cooling process. The flexible cushioned cooler may have an integrated fabric cover, which can be molded together in the desired shape and size to fit into the complimentary shaped docking area of the carrying, cooling and support device. Thus, the portable device is protected from heat damage when placed on top of the docking area.

Exemplary embodiments provide a carrying, cooling and support device capable of effectively dissipating heat produced by portable computers when in use, so as to protect the components inside these portable computers and prolong the service lives of portable computer batteries. In operation on a users lap, the fan is advantageously positioned to draw in cooling air unrestricted by either of the user's legs.

Thus, preferred embodiments can be carried by users conveniently as a device to keep portable computers and laps cool. When used for computing, such devices can protect users' legs, clothing, bedding or furniture from excessive heat while conformably supporting the computer on uneven surfaces. When used for carrying a portable computer, such devices serve as protective shock or impact absorbers.

These and other features of the present disclosure may be readily ascertained by one of ordinary skill in the pertinent art based on the teachings herein. Although illustrative embodiments have been described herein with reference to the accompanying drawings, it is to be understood that the present disclosure is not limited to those precise embodiments, and that various other changes and modifications may be effected therein by those of ordinary skill in the pertinent art without departing from the scope or spirit of the present disclosure. All such changes and modifications are intended to be included within the scope of the present disclosure as set forth in the appended claims.

What is claimed is:

1. A combined carrying, cooling and support device for a portable electronic unit, the device comprising:
   a flexible cushioned cooler having a base portion, at least one angled side portion disposed at an acute angle relative to the base portion, and an integrated cooling fan;
   an attachment mechanism disposed about the periphery of the flexible cushioned cooler; and
   an upper cover removably attachable to the flexible cushioned cooler by the attachment mechanism to cover the flexible cushioned cooler such that the portable electronic unit can be carried between the flexible cushioned cooler and the upper cover,
   wherein the flexible cushioned cooler is configured to form an elongated cooling air channel between its base portion, its at least one angled side portion, and a bottom surface of the portable electronic unit.

2. The device of claim 1 wherein the integrated fan is configured to intake air axially through the flexible cushioned cooler and push the air towards the bottom surface of the portable electronic unit, and wherein the cooling air channel is configured to redirect the air from the bottom surface of the unit outwards through open sides of the cooler at the ends of the elongated channel.

3. The device of claim 1 wherein the flexible cushioned cooler includes at least one elongated slot substantially parallel to the elongated channel, the at least one elongated slot disposed in the at least one angled side portion for permitting a limited portion of cooling air to flow perpendicular to the elongated channel towards the front or back of the electronic unit.

4. The device of claim 1 wherein the flexible cushioned cooler includes a flexible ethylene vinyl acetate (EVA) molded pad laminated with fabric.

5. The device of claim 1, further comprising at least one of an external pocket, a workstation enclosure, an internal file pocket, an accessory pocket, a support stand, a handle, or a carrying strap attached to the upper cover.

6. The device of claim 1 wherein the flexible cushioned cooler includes at least one molded recess for accepting the fan or cables thereto.

7. The device of claim 1 wherein the flexible cushioned cooler further includes a second angled side portion disposed at an acute angle relative to the base portion.

8. The device of claim 7 wherein the first and second angled side portions are each disposed at an acute angle of about 15 degrees relative to the base portion.

9. The device of claim 7 wherein the flexible cushioned cooler includes two elongated slots substantially parallel to the elongated channel, the first elongated slot disposed in the first angled side portion for permitting a limited portion of cooling air to flow perpendicular to the elongated channel towards the back of the electronic unit, and the second elongated slot disposed in the second angled side portion for permitting a limited portion of cooling air to flow perpendicular to the elongated channel towards the front of the electronic unit.

10. The device of claim 9 wherein the two elongated slots each have a membrane of remaining material such that they do not extend entirely through the flexible cushioned cooler from top to bottom.

11. The device of claim 1 wherein:
   the integrated fan includes a ring structure covering a fan assembly and configured for cable storage; and
   the acute angle relative to the base portion is determined so as to establish an angled air channel and to facilitate the cable storage.

12. A combined carrying, cooling and support device for a portable electronic unit, the device comprising:
   a flexible cushioned cooler having a base portion, at least one angled side portion disposed at an acute angle relative to the base portion, and an integrated cooling fan;
   a lower cover having an attachment mechanism disposed about its periphery, the lower cover configured to conformably receive the flexible cushioned cooler; and
   an upper cover removably attachable to the lower cover by the attachment mechanism to cover the flexible cushioned cooler such that the portable electronic unit can be carried between the flexible cushioned cooler and the upper cover,
   wherein the flexible cushioned cooler is configured to form an elongated cooling air channel between its base portion, its at least one angled side portion, and a bottom surface of the portable electronic unit.

13. The device of claim 12 wherein the integrated fan is configured to intake air axially through the flexible cushioned cooler and push the air towards the bottom surface of the portable electronic unit, and wherein the cooling air channel is configured to redirect the air from the bottom surface of the unit outwards through open sides of the cooler at the ends of the elongated channel.

14. The device of claim 12 wherein the flexible cushioned cooler includes at least one elongated slot substantially parallel to the elongated channel, the at least one elongated slot disposed in the at least one angled side portion for permitting a limited portion of cooling air to flow perpendicular to the elongated channel towards the front or back of the electronic unit.

15. The device of claim 12 wherein the flexible cushioned cooler includes a flexible ethylene vinyl acetate (EVA) molded pad laminated with fabric.

16. The device of claim 12, further comprising at least one of an external pocket, a workstation enclosure, an internal file pocket, an accessory pocket, a support stand, a handle, or a carrying strap attached to at least one of the upper or lower covers.

17. The device of claim 12 wherein the flexible cushioned cooler includes at least one molded recess for accepting the fan or cables thereto.

18. The device of claim 12 wherein the flexible cushioned cooler further includes a second angled side portion disposed at an acute angle relative to the base portion.

19. The device of claim 18 wherein the first and second angled side portions are each disposed at an acute angle of about 15 degrees relative to the base portion.

20. The device of claim 18 wherein the flexible cushioned cooler includes two elongated slots substantially parallel to the elongated channel, the first elongated slot disposed in the first angled side portion for permitting a limited portion of cooling air to flow perpendicular to the elongated channel towards the back of the electronic unit, and the second elongated slot disposed in the second angled side portion for permitting a limited portion of cooling air to flow perpendicular to the elongated channel towards the front of the electronic unit.

21. The device of claim 20 wherein the two elongated slots each extend entirely through the flexible cushioned cooler from top to bottom.

* * * * *